(12) United States Patent
Matsunaga

(10) Patent No.: US 8,720,952 B2
(45) Date of Patent: May 13, 2014

(54) CONNECTOR

(75) Inventor: Eiji Matsunaga, Komaki (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 385 days.

(21) Appl. No.: 12/562,466

(22) Filed: Sep. 18, 2009

(65) Prior Publication Data

US 2010/0078934 A1    Apr. 1, 2010

(30) Foreign Application Priority Data

Sep. 30, 2008  (JP) ................................. 2008-252935
Jun. 23, 2009  (JP) ................................. 2009-148383

(51) Int. Cl.
*F16L 35/00*    (2006.01)

(52) U.S. Cl.
USPC ............................................ 285/93; 285/319

(58) Field of Classification Search
USPC .................................................. 285/93, 319
See application file for complete search history.

(56) References Cited

U.S. PATENT DOCUMENTS

| 4,946,205 | A | * | 8/1990 | Washizu | ....................... | 285/319 |
| 5,593,187 | A | * | 1/1997 | Okuda et al. | ................... | 285/305 |

FOREIGN PATENT DOCUMENTS

| JP | 1-146091 | 10/1989 |
| JP | 1-158890 | 11/1989 |
| JP | 10-141567 | 5/1998 |
| JP | 10-220666 | 8/1998 |
| JP | 11-210968 | 8/1999 |
| JP | 11-344182 | 12/1999 |
| JP | 2003-343782 | 12/2003 |
| JP | 2005-106241 | 4/2005 |
| WO | 94/27077 | 11/1994 |
| WO | 2007/066675 | 6/2007 |

OTHER PUBLICATIONS

English language Abstract of JP 11-344182, Dec. 14, 1999.
English language Abstract of JP 2003-343782, Dec. 3, 2003.
Japan Office action, mail date is Nov. 5, 2013.
Japan Office action, dated Jun. 13, 2013 along with an english translation thereof.

* cited by examiner

*Primary Examiner* — Aaron Dunwoody
(74) *Attorney, Agent, or Firm* — Greenblum & Bernstein, P.L.C.

(57) ABSTRACT

A connector includes a female member, and a checking member. The female member has a housing being provided with paired windows. The checking member is assembled outward with and retained onto the housing from the axially perpendicular direction, and has a letter "C"-shaped portion and paired locker protrusions. The locker protrusions have a first locker, a leading-end contact, and an inclined second locker, respectively. The first lockers inhibit an assembly-line worker or robot from pulling the checking member from out of the housing. The leading-end contacts expand the letter "C"-shaped portion diametrically when a male member is inserted into the female member completely. The inclined second lockers inhibit elastic force, which arises in the letter "C"-shaped portion, from removing the checking member from the housing. The housing further has a fitting dent. The checking member's letter "C"-shaped portion has a fitting protrusion that fits into the fitting dent.

14 Claims, 22 Drawing Sheets

CONNECTOR

INCORPORATION BY REFERENCE

The present invention is based on Japanese Patent Application No. 2008-252, 935, filed on Sep. 30, 2008, and on Japanese Patent Application No. 2009-148,383, filed on Jun. 23, 2009, the entire contents of which are incorporated herein by reference.

BACKGROUND OF THE INVENTION

1. Field of the Invention

The present invention relates to a connector that is used for connecting a hose to a male member, such as a pipe. More particularly, it relates to a connector that makes it possible to confirm how it is connected to a male member.

2. Description of the Related Art

A connector that connects a hose to a male member, such as a pipe, can preferably have a checking member for confirming how the hose is connected to the male member. As the connector that has such a checking member, connectors that are disclosed in Japanese Unexamined Patent Publication (KOKAI) Gazette No. 11-344,182 and Japanese Unexamined Patent Publication (KOKAI) Gazette No. 2003-343,782 have been known. As illustrated in FIGS. 29 and 30, such a conventional connector comprises a female-member body 82, a locking member 83, and a checking member 84. The female-member 82 has a substantially cylinder-shaped housing 81 that is provided with an insertion opening end 81a. A pipe-shaped male member 80 is inserted into the housing 81 of the female-member body 82 through the insertion opening end 81a. The male-member 80 has a ring-shaped protrusion 80a that protrudes centrifugally from a predetermined position, which is disposed away from the leading end by a predetermined distance. The locking member 83 is inserted into and then retained to one of the opposite ends of the housing 81 on the side of the insertion opening end 81a. That is, the locking member 83 is a member for coupling or connecting the male member 80, which is inserted into the housing 81, to the male-member body 82. The checking member 84 is assembled outward from the axially perpendicular direction and is then retained onto an outer peripheral surface of the housing 81. That is, the checking member 84 is a member for checking whether the male member 80 is coupled to the female-member body 82 or not.

Moreover, the housing 81 of the female-member body 82 is provided with paired windows 81b on one of the opposite ends adjacent to the insertion opening end 81a. The windows 81b penetrate the housing 81 radially, and are put in place circumferentially so as to face each other. In addition, the locking member 83 has paired claws 83a. The claws 83a are capable of deforming elastically in the radial direction, and are put in place at positions, which correspond to the windows 81b, respectively.

Moreover, as illustrated in FIG. 30, the checking member 84 has a letter "C"-shaped portion 84a, and paired locker protrusions 84b, 84b. The letter "C"-shaped portion 84a is assembled outward from the axially perpendicular direction and is then retained onto an outer peripheral surface of the housing 81 of the female-member body 82, and is capable of expanding diametrically by elastic deformation. The locker protrusions 84b, 84b protrude inward from the opposite ends of the letter "C"-shaped portion 84a, and are then inserted into the housing 81 through the windows 81b, respectively. The locker protrusions 84, 84 are provided with a first locker 84c, a leading-end contact 84d, and an inclined second locker 84e, respectively. The first lockers 84c lock to the circumferentially opposite ends of the windows 81b to inhibit the checking member 84 from being pulled from out of the housing 81 of the female-member body 82 before the male member 80 is coupled to the female-member body 82. The leading-end contacts 84d, 84d are pressed by the ring-shaped protrusion 80a of the male member 80 and are then moved outward radially to expand the letter "C"-shaped portion 84a when the male member 80 is inserted into the female-member body 82 completely. The inclined second lockers 84e, 84e lock to the circumferentially opposite rims of the windows 81b, 81b to inhibit the checking member 84 from being pulled from out of the housing 81 of the female-member body 82 by elastic restoring force that the letter "C"-shaped portion 84a exerts on the checking member 84 when the male member 80 is inserted into the female-member body 82 completely.

In the conventional connector, the checking member 84 is assembled outward with and then retained onto an outer peripheral surface of the housing 81 of the female-member body 82 before the male member 80 is coupled to the female-member body 82. Moreover, the letter "C"-shaped portion 84a of the checking member 84 is locked to the circumferentially opposite rims of the windows 81b, 81b in the housing 81 at the first lockers 84c, 84c of the locker protrusions 84b, 84b. In addition, the locker protrusions 84b, 84b of the checking member 84 are inserted up to a more axially inner-side position than the claws 83a of the locking member 83 are present within the windows 81b. When the male member 80 is inserted into the housing 81 of the female-member body 82 under the circumstances, the ring-shaped protrusion 80a of the male member 80 expands the claws 83a, 83a of the locking member 83 outward radially against their elasticity, and then goes past the claws 83, 83. Eventually, the leading ends of the claws 83a, 83a lock to the ring-shaped protrusion 80a. Thus, the male member 80 is coupled to the female-member body 82.

In the above-described coupled state (namely, in the state illustrated in FIGS. 29 and 30), the opposite leading-end contacts 84d, 84d of the checking member 84 are expanded outward radially by the ring-shaped protrusion 80a of the male member 80, and thereby the letter "C"-shaped portion 84a is expanded diametrically. Eventually, the opposite inclined second lockers 84e, 84e of the respective locker protrusions 84b, 84b come in contact with and then lock to the circumferentially opposite rims of the respective windows 81b, 81b in the housing 81 of the female-member body 82, respectively. Thus, the inclined second lockers 84e, 84e of the locker protrusions 84b, 84b, which lock to the circumferentially opposite rims of the windows 81b, 81b, make it possible to inhibit the checking member 84 from being come off from the housing 81 by elastic restoring force that the letter "C"-shaped portion 84a exerts on the checking member 84.

Then, when an assembly-line worker or robot tries to pull out and then remove the checking member 84 from the housing 81 of the female-member body 82 that is coupled to the male member 80, the letter "C"-shaped portion 84a of the checking member 84 is expanded diametrically furthermore because the opposite inclined second lockers 84e, 84e of the respective locker protrusions 84b, 84b contact slidingly with the circumferentially opposite rims of the respective windows 81b, 81b. Accordingly, the assembly-line worker or robot can pull out and then remove the checking member 84 from the housing 31 with ease. Thus, the assembly-line worker or robot can confirm the coupling between the male member 80 and the female-member body 82. Note that it is often the case that the coupling between the male member 80 and the female-member body 81 is incomplete when the checking member 84 does not come off from the housing 81 even if the assembly-line worker or robot pulls the checking member 84. Consequently, the assembly-line worker or robot carries out the coupling operation again in order to insert the insertion end of the male member 80 into the housing 81 of the female-member body 82 fully.

Moreover, International Publication No. 2007/066675, and International Publication No. 1994/027077 disclose other conventional connectors. Such a conventional connector comprises a construction in which a male member presses a checking member to deform it elastically in the axial direction. In addition, in order that the checking member does not fall down from a housing in the axial direction when the male member presses the checking member, a protrusion, which is formed on the checking member, is inserted into a dent, which is formed in the housing.

Now, back to the conventional connector illustrated in FIGS. 29 and 30, the insertion end of the male member 80 might be inserted into the housing 81 of the female-member body 82 in such a manner that the insertion end is inclined in an oblique direction with respect to an imaginary axial line of the housing 81 when it is inserted into the housing 81. In the conventional connector, namely, in the connector comprising the construction in which the checking member 84 has the letter "C"-shaped portion 84a, if the insertion end of the male member 80 is inserted in such a manner that it is inclined toward one of the opposite locker protrusions 84b, 84b, for instance, then the insertion end of the male member 80 comes in contact with the one of the opposite locker protrusions 84b, 84b to expand the one of the opposite locker protrusions 84b, 84b diametrically under such a circumstance. The one of the opposite locker protrusions 84b, 84b, which has been thus expanded diametrically once, locks to the circumferentially opposite rims of one of the windows 81b, 81b in the housing 81. If such is the case, however, the opposite leading-end contacts 84d, 84d of the checking member 84 do not return to their original positions even when they are released from the contact with the insertion end of the male member 80, because the letter "C"-shaped portion 84a does not exert enough elastic restoring force on them.

In the situations like above, only the leading-end contact 84d of the one of the locker protrusions 84b, 84b has been pressed to expand outward radially, even though it does not come in contact with the ring-shaped protrusion 80a of the male member 80. Accordingly, only the inclined second locker 84e of the one of the locker protrusions 84b, 84b is put in such a state that it comes in contact with and is then locked to the circumferentially opposite rims of one of the windows 81b, 81b in the housing 81. When an assembly-line worker or robot pulls the checker 84 strongly under the circumstances, it might be possible to think of such a situation that the checking member 84 has been come off from the housing 81 of the female-member body 82, because the inclined second locker 84c of the one of the locker protrusions 84b, 84b might be released from the locked state to the circumferentially opposite rims of one of the windows 81b, 81b in the housing 81. If the checking member 84 has thus come off from the housing 81 even though the coupling between the male member 80 and the female-member body 82 is incomplete (or improper), it cannot fulfill the function of checking member per se.

Note that Japanese Unexamined Patent Publication (KOKAI) Gazette No. 2003-343,782 discloses to provide an outer peripheral surface of the housing 81 of the female-member body 82 with two protruded streaks having an identical shape to each other. The protruded streaks are formed so as to extend parallelly to each other in the circumferential direction. Moreover, the gazette discloses to provide a central flat section of the letter "C"-shaped portion 84a of the checking member 84 with a circumferential-shift inhibitor protrusion. The circumferential-shift inhibitor protrusion is disposed adjacent to one of the lengthwise ends of the central flat section of the letter "C"-shaped portion 84a, and protrudes toward one of the axially opposite ends. In addition, the gazette discloses to provide the central flat section of the letter "C"-shaped portion 84a of the checking member 84 with another circumferential-shift inhibitor protrusion. The another circumferential-shift inhibitor protrusion is disposed adjacent to the other one of the lengthwise ends of the central flat section of the letter "C"-shaped portion 84a, and protrudes toward the other one of the axially opposite ends. If such is the case, the circumferential-shift inhibitor protrusions are pressed onto the steaks on one of the axially opposite sides of the letter "C"-shaped portion 84a alone when external force acts on the checking member 84 in the circumferential direction. Accordingly, the resulting rotary forces, which act on the letter "C"-shaped portion 84a about the circumferential-shift inhibitors, incline in the axial direction. Consequently, it is possible to prevent the locker protrusions 84b, 84b of the checking member 84 from moving in the axially perpendicular direction and then readily coming off from the circumferentially opposite rims of the windows 81b, 81b in the housing 81 of the female-member body 82. Thus, when the male member 80 is coupled to the female-member body 82 incompletely (or improperly), it is possible to avoid such an adverse situation that the checking member 84 comes off from the housing 81 readily even if an assembly-line worker or robot should pull the checking member 84 strongly.

However, employing the above-described engineering technique disclosed in Japanese Unexamined Patent Publication (KOKAI) Gazette No. 2003-343,782 results in enlarging the housing 81 of the female-member body 82, because an outer peripheral surface of the housing 81 is provided with the two protruded streaks so that the outside-diameter dimension of the housing 81 has become larger by the protruded streaks. Therefore, it is difficult to apply the engineering technique disclosed in the gazette to the following cases: a cover is attached around the outer periphery of the housing 81 after coupling the conventional connector to the male member 80 and then pulling the checking member 84 from out of the housing 81 to remove it; and the size of the housing cannot be changed in connection with piping layout.

Note that, in the conventional connectors that are disclosed in International Publication No. 2007/066675 and International Publication No. 1994/027077, the male member presses the checking member axially, thereby making the checking member removable. Therefore, the above-described problem does not occur in the conventional connectors with such a construction. That is, the aforementioned problem is an inherent problem with the checking member that has the letter "C"-shaped portion.

SUMMARY OF THE INVENTION

The present invention has been developed in view of such circumstances. It is therefore an object of the present invention to provide a connector that employs a checking member with a letter "C"-shaped portion, but connector which enables the checker to fulfill the function of checking member per se more reliably without ever changing the outside-diameter dimension of female member.

In order to achieve the aforementioned object, the following improvements are made: the cylindrical portion of male member is provided with a fitting dent that opens in the outer peripheral surface; and the checking member is provided with a fitting protrusion that protrudes inwardly from the letter "C"-shaped portion's inner peripheral surface and then fits into the fitting dent in the circumferential direction of the cylindrical portion at least.

Specifically, a connector according to the present invention is couple to a cylindrical male member that has an insertion end being provided with a ring-shaped protrusion protruding centrifugally from a position that is away from an axial leading end of the insertion end by a predetermined distance, and comprises:

a female member comprising a cylindrical portion on one of the axial opposite ends, the cylindrical portion being provided with an insertion opening end into which the insertion end of the male member is inserted, paired windows penetrating radially and being disposed circumferentially so as to face each other, and a locker end locking to the ring-shaped protrusion of the male member, which is inserted into the female member through the insertion opening end, and then inhibiting the male member from coming off;

a checking member being assembled outward with and retained onto an outer peripheral surface of the cylindrical portion of the female member, and comprising a letter "C"-shaped portion having opposite ends and being capable of expanding diametrically by elastic deformation, and paired locker protrusions protruding inwardly from the opposite ends of the letter "C"-shaped portion respectively and then being inserted into the cylindrical portion through the paired windows in the female member respectively;

the locker protrusions of the checking member not only locking to circumferentially opposite ends of the windows in the female member to inhibit the checking member from being come off from the cylindrical portion of the female member before the male member is coupled to the female member, but also being pressed by the ring-shaped protrusion of the male member, and then moving outward radially to expand the letter "C"-shaped portion of the checking member diametrically, thereby enabling the checking member to become off from the cylindrical portion of the female member when the male member is inserted into the female member to complete the coupling therebetween;

the cylindrical portion of the female member being provided with a fitting dent that opens in the outer peripheral surface; and the checking member further comprising a fitting protrusion protruding inwardly from an inner peripheral surface of the letter "C"-shaped portion, and then being fitted into the fitting dent of the cylindrical portion of the female member circumferentially at least.

Note that, in the present specification, the term, "axially" or "in the axial direction," means the axial direction in the female member, and the term, "circumferentially" or "in the circumferential direction," means the circumferential direction in the female member.

In the connector according to the present invention, the checker is assembled outward with and retained onto an outer peripheral surface of the cylindrical portion of the female member from the axially perpendicular direction while the fitting protrusion, which is disposed on the letter "C"-shaped portion of the checking member, is fitted into the fitting dent, which is disposed in the cylindrical portion, before the male member is coupled to the female member. In this instance, not only the locker protrusions of the checking member are inserted into the cylindrical portion through the windows respectively, but also the locker protrusions are locked to the circumferentially opposite ends of the windows respectively. Since the locker protrusions are thus locked to the circumferentially opposite ends of the windows, it is possible to inhibit the checking member reliably from being pulled out of and then being come off from the cylindrical portion. Moreover, even when an assembly-line worker or robot tries to pull out the checking member and then remove it from the cylindrical portion under the circumstances, it is not possible for the assembly-line worker or robot to remove the checking member from the cylindrical portion with ease.

When an assembly-line worker or robot inserts the insertion end of the male member into the cylindrical portion of the female member through the insertion opening end, the ring-shaped protrusion of the male member is locked to the female member's locker end, which is disposed within the cylindrical portion, upon the male member being inserted into the female member by a predetermined distance. Consequently, the male member, and the female member are coupled to each other.

When the male member is inserted into the female member completely, the checking member, namely, the locker protrusions' part, which is placed within the moving locus of the male member's ring-shaped protrusion, is pressed by the ring-shaped protrusion to move outward radially. Accordingly, the checking member's letter "C"-shaped portion is expanded diametrically. When the checking member's letter "C"-shaped portion thus expands diametrically, the checking member's locker protrusions come in contact with and then lock to the circumferentially opposite ends of the windows in the cylindrical portion of the female member. Consequently, the locker protrusions, which are thus locked to the circumferentially opposite ends of the windows, inhibit the checking member from being come off from the female member's cylindrical portion by elastic restoring force that the letter "C"-shaped portion exerts on the checking member.

Under the circumstances, when an assembly-line worker or robot pulls out the checking member to remove it from the cylindrical portion of the female-member, the checking member's letter "C"-shaped portion is expanded furthermore diametrically because the checking member's respective locker protrusions come in sliding contact with the opposite circumferentially ends of the respective windows in the female member's cylindrical portion. Consequently, the assembly-line worker or robot can pull out and then remove the checking member from the cylindrical portion with ease. Thus, the assembly-line worker or robot can confirm that the male member is coupled to the female member completely (or properly).

In particular, when inserting the insertion end of the male member into the cylindrical portion of the female member in the connector according to the present invention, if the insertion end of the male member is inserted into the cylindrical portion of the female member in such a manner that the insertion end is inclined toward one of the locker protrusions of the checking member, the insertion end of the male member comes in contact with the one of the locker protrusions of the checking member to press and then expand the one of the locker protrusions outward radially. Even if the one of the locker protrusions is pressed and then expanded outward radially, the letter "C"-shaped portion of the checking member is inhibited from shifting or displacing with respect to the cylindrical portion in the circumferential direction, because the fitting protrusion of the letter "C"-shaped portion is fitted into the fitting dent in the cylindrical portion. Therefore, the other one of the locker protrusions of the checking member maintains the state that it is locked to the circumferentially opposite ends of the windows in the cylindrical portion. Meanwhile, the one of the locker protrusions of the checking member is put in such a state that it is not locked to the windows in the cylindrical portion substantially.

That is, elastic restoring force, which makes the one of the locker protrusions of the checking member return inward radially, acts on the one of the locker protrusions sufficiently. Accordingly, when the insertion end of the male member is released from the contact with the one of the locker protrusions, the one of the locker protrusions returns to the original position. Consequently, the checking member hardly comes off from the cylindrical portion of the female member even when an assembly-line worker or robot pulls the checking member strongly. Therefore, although the coupling between the male member and the female member is incomplete (or improper), it is possible to keep the checking member from coming off from the cylindrical portion of the female member. Thus, it is possible for the checking member to fulfill the function of checking member per se more reliably.

Moreover, in the connector according to the present invention, the fitting dent with which the cylindrical portion of the female member is provided does not at all protrude outward from an outer peripheral surface of the cylindrical portion. Accordingly, it is unnecessary to change the outside-diameter dimension of the cylindrical portion. Consequently, it is possible to provide the cylindrical portion with a desirable fitting dent not only when a cover is fitted around the outer periphery of the cylindrical portion but also when the size of the cylindrical portion cannot be changed in connection with piping layout.

All in all, the connector according to the present invention makes it possible to let the checking member perform its own function more reliably without ever changing the outside-diameter dimension of the female member's cylindrical portion.

Note that, in the connector according to the present invention, the fitting dent with which the cylindrical portion of the female member is provided can be either a dent that opens in the cylindrical portion's outer peripheral surface alone or a through hole that opens in both of the cylindrical portion's inner peripheral surface and outer peripheral surface. In the present connector, the deeper the fitting dent's depth is, the greater it is possible to make circumferential and axial fitting areas over which the fitting dent contacts with the fitting protrusion that is fitted into the fitting dent. Accordingly, it is possible to set up the fitting dent's depth adequately while taking into consideration the strength or wall thickness that is required for the cylindrical portion. Moreover, changing the fitting dent's shape makes it possible to change the fitting dent's circumferential length and axial length, namely, the circumferential and axial fitting areas that the fitting dent exhibits to the fitting protrusion. As for the fitting dent's shape, it is possible to select any one of the following shapes at will: rectangular shapes, circular shapes, letter-"I" shapes, letter-"Z" shapes and letter-"H" shapes, for instance. In addition, the quantity of the fitting dent can be either singular or plural. On the other hand, it is possible to form the fitting protrusion, with which the checking member is provided with, so as to be adapted into the fitting dent's shape or size. However, it is preferable to adapt the fitting protrusion'shape or size that coincides with that of the fitting dent. Note that the term, "coinciding with," herein refers to that the fitting protrusion and fitting dent fit snugly to each other, that is, they have shapes with which they are contacted with each over their entire surfaces.

Moreover, in the connector according to the present invention, it is preferable that the locker protrusion of the checking member and the locker dent of the female member's cylindrical portion, which are fitted to each other in the circumferential direction, can inhibit the letter "C"-shaped portion of the checking member from shifting or displacing in the circumferential direction, shifting or displacing which results from force that the male member exerts on the letter "C"-shaped portion to expand it diametrically. Note that a cause of the occurrence of the letter "C"-shaped portion's circumferential shift or displacement is specified herein. In other words, one of the present connector's constructions, namely, the fitting protrusion and fitting dent, can act effectively on the letter "C"-shaped portion's circumferential shift or displacement that occurs due to the cause.

In addition, in the connector according to present invention, it is also allowable that:

the cylindrical portion of the female member can be provided with the fitting dent at two locations in the outer peripheral surface, locations which are separated away from each other circumferentially; and the fitting protrusion of checking member can comprise:

a first fitting protrusion being disposed on one of the opposite sides of the letter "C"-shaped portion of the checking member off from a circumferentially central section of the letter "C"-shaped portion, and being fitted into one of the fitting dents that is present on one of the circumferentially opposite sides with respect to the first fitting protrusion; and a second fitting protrusion being disposed on another one of the opposite sides of the letter "C"-shaped portion of the checking member off from the circumferentially central section of the letter "C"-shaped portion, and being fitted into another one of the fitting dents that is present on another one of the circumferentially opposite sides with respect to the second fitting dent.

In accordance with the above-described optional construction, it is possible to provide the outer peripheral surface of the female member's cylindrical portion and the letter "C"-shaped portion of the checking member with the fitting dent and the fitting protrusion optimally in a quantity of two or more, respectively, where the outer peripheral surface of the cylindrical portion is provided with the fitting dent at two or more locations that are separated away from each other in the circumferential direction.

Moreover, in the connector according to the present invention with the above-described optional construction, it is preferable that the first fitting protrusion, and the second protrusion can be disposed on the opposite sides of the letter "C"-shaped portion of the checking member, respectively, opposite sides which interpose the circumferentially central section of the letter "C"-shaped portion between them. In accordance with this optional preferable construction, the letter "C"-shaped portion of the checking member expands diametrically when an assembly-line worker or robot mounts the checking member onto the female member. Accordingly, the diametrically-expanding letter "C"-shaped portion expands the separation distance between the first and second fitting protrusions. Then, the letter "C"-shaped portion can lock to the female member firmly on the inner side between the first and second fitting protrusions (or in proximity to the circumferentially central section) when the checking member is mounted onto the female member. Consequently, even when the aforementioned phenomenon that results in the above-described problems occurs, namely, even when the insertion end of the male member is inserted into the female member obliquely, the optional preferable construction makes it possible to inhibit the letter "C"-shaped portion of the checking member more effectively from shifting or displacing in the circumferential direction.

In addition, in the connector according to the present invention that is constructed optionally as described above, it is also allowable that the first fitting protrusion can be formed so as to contact, of surfaces of one of the fitting dents, a surface that is adjacent to the another one of the opposite ends of the letter "C"-shaped portion of the checking member; and the second fitting protrusion can be formed so as to contact, of surfaces of another one of the fitting dents, a surface that is adjacent to the one of the opposite ends of the letter "C"-shaped portion of the checking member.

By means of the connector according to the present invention with the above-described optional construction, it is possible to inhibit the first and second fitting protrusions of the checking member and the one of the fitting dents of the female member's cylindrical portion and the another one of them reliably from shifting or displacing relatively to each other in the circumferential direction. Accordingly, it is possible to inhibit the checking member and the cylindrical portion reliably from shifting or displacing relatively to each other in the circumferential direction. Consequently, it is possible for the checking member to perform its own function more reliably. Note, in this instance, that the surface of one of the fitting dents with which the first fitting protrusion contacts, and the surface of the other one of the fitting dents with which the second fitting protrusion contacts make inside surfaces to each other in the circumferential direction.

Moreover, in the connector according to the present invention that is constructed optionally as described above, it is also allowable that the first fitting protrusion can be formed so as to contact, of surfaces of one of the fitting dents, a surface that is adjacent to the one of the opposite ends of the letter "C"-shaped portion of the checking member; and the second fitting protrusion can be formed so as to contact, of surfaces of another one of the fitting dents, a surface that is adjacent to the another one of the opposite ends of the letter "C"-shaped portion of the checking member.

By means of the connector according to the present invention with the above-described optional construction, it is possible to inhibit the first and second fitting protrusions of the checking member and the one of the fitting dents of the female member's cylindrical portion and the another one of them reliably from shifting or displacing relatively to each other in the circumferential direction. Accordingly, it is possible to inhibit the checking member and the cylindrical portion reliably from shifting or displacing relatively to each other in the circumferential direction. Consequently, it is possible for the checking member to perform its own function more reliably. Note, in this instance, that the surface of one of the fitting dents with which the first fitting protrusion contacts, and the surface of the other one of the fitting dents with which the second fitting protrusion contacts make outside surfaces to each other in the circumferential direction.

In addition, in the connector according to the present invention, it is also allowable that the fitting protrusion of the checking member can protrude inwardly from a circumferentially central section of the letter "C"-shaped portion. This optional construction enables connector designers to provide the letter "C"-shaped portion of the checking member with the fitting protrusion in a minimum quantity and at the most suitable position.

Moreover, in the connector according to the present invention with the above-described optional construction, it is also allowable that the fitting protrusion of the checking member can have circumferentially opposite side surfaces that are formed so as to contact circumferentially opposite side surfaces of the fitting dent in the cylindrical portion of the female member. The present connector having the optional constructions dually makes it possible to inhibit the fitting protrusion of the checking member and the fitting dent in the female member's cylindrical portion reliably from shifting or displacing relatively to each other in the circumferential direction. Accordingly, the present connector makes it possible to inhibit the checking member and the cylindrical portion reliably from shifting displacing relatively to each other in the circumferential direction. Consequently, the present connector makes it possible to keep the checking member from coming off from the female member's cylindrical portion, even though the male member and the female member are coupled incompletely (or improperly). Therefore, the present connector enables the checker to fulfill the function of checker per se more reliably.

In addition, in the connector according to the present invention with the above-described optional construction, it is also allowable that the fitting protrusion of the checking member can have axially opposite side surfaces that are formed so as to contact axially opposite side surfaces of the fitting dent in the cylindrical portion of the female member. It is possible for the present connector having the optional constructions dually to inhibit the fitting protrusion of the checking member and the fitting dent in the female member's cylindrical portion reliably from shifting or displacing relatively to each other in the axial direction. Moreover, when an assembly-line worker or robot pulls out the checking member from the female member's cylindrical portion obliquely so that the checking member is inclined toward one or another of one of the axially opposite ends of the female member from the axially perpendicular direction, it is possible for the present connector to inhibit the checking member from inclining in the pull-out direction. Accordingly, the letter "C"-shaped portion of the checking member hardly inclines in the pull-out direction, and thereby it hardly becomes likely that the paired locker protrusions are uncoupled from the circumferentially opposite ends of the windows in the female member's cylindrical portion, or vice versa. Consequently, it is possible for the present connector to make the checking member fulfill the function of checker per se adequately.

Moreover, in the connector according to the present invention, it is also allowable that the checking member can further comprise an inclination inhibitor that extends integrally from around a circumferentially central section of the letter "C"-shaped portion to at least one of axially opposite end sides of the cylindrical portion of the female member and another one of axially opposite end sides thereof, and that comes in contact with an outer peripheral surface of the cylindrical portion of the female member at least and thereby inhibits the letter "C"-shaped portion, which is retained so as to rise in an axially perpendicular direction with respect to the cylindrical portion, from inclining toward at least one of the axially opposite sides and another one of axially opposite sides of the cylindrical portion.

Even if an assembly-line worker or robot tries to pull out the checking member in an oblique direction in which the inclination inhibitor extends before inserting the male member into the female member completely, that is, when the male member is not coupled to the female member completely (or properly) but when the locker protrusions of the checking member still lock to the circumferentially opposite ends of the windows in the female member's cylindrical portion, the connector according to the present invention comprising the checking member that is further provided with the above-described inclination inhibitor does not allow the letter "C"-shaped portion of the checking member to incline in the pulled-out direction so that the locker protrusions of the checking member are hardly less likely to unlock from the circumferentially opposite ends of the windows. Therefore, the checking member can perform its own function adequately. In particular, in the case where the circumferentially opposite side surfaces of the checking member's fitting protrusions are formed so as to contact the circumferentially opposite side surfaces of the fitting dent in the female member's cylindrical portion, it is possible to expect that the inclination inhibitor produces a synergic advantageous effect together with the fitting protrusion and fitting dent. Moreover, it is also feasible to downsize the inclination inhibitor itself by shortening its axial length.

In addition, in the connector according to the present invention, it is also allowable that the female member can further comprise:
- a cylindrical housing being provided with the insertion opening end and the paired windows; and
- a locking member being formed independently of the housing, being inserted into and then retained within the housing, and being provided with paired claws that are capable of deforming elastically in a radial direction and are disposed at positions corresponding to the paired windows respectively; and
- the claws making the locker end of the female member, and being provided with an inclined inner surface that inclines inwardly in a radial direction as it comes from the insertion opening end toward an axially inner side of the female member and that is pressed by and is then brought into sliding contact with the ring-shaped protrusion of the male member when the male member is being inserted into the female member, respectively.

In accordance with the connector according to the present invention comprising the female member that is constructed optionally as described above, the male member is coupled to the female member by way of the locking member. Accordingly, it is feasible to release the coupling between the male member and the female member easily by removing the locking member from the female member together with the male member. Consequently, the present connector with the optionally constructed female member is advantageous for mechanics when they carry out maintenance works.

Moreover, in the connector according to the present invention comprising the female member that is constructed optionally as described above, it is further allowable that the fitting protrusion can have a diametrically inner end that is disposed flush with an inner peripheral surface of the housing of the female member, or that is disposed more outward diametrically than an inner peripheral surface of the housing is. The checking member being provided with the fitting protrusion that is constructed optionally as described herein does not interfere with the locking member when an assembly-line worker or robot attaches the locking member onto the female member's housing.

In addition, in the connector according to the present invention, it is allowable that the fitting dent in the cylindrical portion of the female member can make a non-penetrating depression. That is, the fitting dent in the female member's cylindrical portion opens in an outer peripheral surface of the cylindrical portion alone. To put it differently, the fitting dent does not at all penetrate through the cylindrical portion from the outer peripheral surface to the inner peripheral surface. Therefore, the non-penetrating depression enables the cylindrical portion to exhibit high rigidity or strength, compared with that of the cylindrical portion being provided with a penetrating fitting dent.

On the contrary, in the connector according to the present invention, it is allowable that the fitting dent in the cylindrical portion of the female member can make a through hole that penetrates from an outer peripheral surface of the cylindrical portion to an inner peripheral surface thereof. With the through-hole fitting dent, the fitting dent can hook onto the fitting protrusion, or vice versa, with a greater hooking magnitude. Therefore, the through-hole fitting dent makes it possible to inhibit the female member's cylindrical portion and the checking member reliably from shifting or displacing relatively to each other in the circumferential direction.

Moreover, in the connector according to the present invention, it is also allowable that each of the locker protrusions of the checking member can have:
- a first locker locking to the circumferentially opposite ends of the paired windows in the cylindrical portion of the female member before the male member is coupled to the female member, thereby inhibiting the checking member from being pulled from out of the cylindrical portion of the female member;
- a leading-end contact being disposed within a locus of the ring-shaped protrusion of the male member when the male member is inserted into the female member but before the male member is coupled to the female member, and being pressed by the ring-shaped protrusion and then moving outward radially when the male member is inserted into the female member completely, thereby expanding the letter "C"-shaped portion of the checking member diametrically; and
- an inclined second locker locking to the circumferentially opposite rims of the windows in the cylindrical portion of the female member when the male member is inserted into the female member completely, thereby inhibiting the checking member from being pulled from out of the cylindrical portion of the female member by elastic restoring force that the letter "C"-shaped portion of the checking member exerts thereon, and extending while inclining in a virtually centripetal direction of the cylindrical portion of the female member in order to furthermore expand the letter "C"-shaped portion diametrically by coming in sliding contact with the circumferentially opposite rims of the windows after the male member is inserted into the female member completely but when the checking member is pulled from out of the cylindrical portion of the female member.

The connector according to the present invention with the above-described optional construction makes it possible to materialize the above-described locker protrusions more reliably. Moreover, when the locker protrusions of the checking member comprise the first locker, the leading-end contact and the inclined second locker as aforementioned, the locker protrusions make the aforementioned problem less likely to occur. That is, when an assembly-line worker or robot inserts the insertion end of the male member into the female member's cylindrical portion, if the insertion end of the male member is inserted into the cylindrical portion in such a manner that it is inclined toward one of the fitting protrusions, the insertion end of the male member comes in contact with the one of the fitting protrusions and then expands outward the one of the fitting protrusions diametrically. When the one of the fitting protrusions is thus expanded outward diametrically, elastic restoring force, which causes the one of the fitting protrusions to contract inward radially to recover the original shape, acts on the one of the fitting protrusions. Accordingly, when the insertion end of the male member is released from the contact with the one of the fitting protrusions, the elastic restoring force returns the one of the fitting protrusions back to the original position. Consequently, even when the assembly-line worker or robot pulls the checking member strongly, the checking member is hardly removed from the cylindrical portion. Therefore, it is possible to keep the checking member from coming off from the cylindrical portion, even though the male member is coupled to the female member incompletely (or improperly). All in all, the connector according to the present invention with the above-described optional construction enables the checking member to perform its own function more reliably.

Meanwhile, note that, in the connector according to the present invention with the above-described optional construction, the fitting protrusion of the checking member and the fitting dent in the female member's cylindrical portion that are fitted each other inhibit the locker protrusions of the checking member's letter "C"-shaped portion from being expanded diametrically furthermore and then being pressed to expand outward radially.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

FIGS. 8(a) and 8(b) are diagrams for illustrating a checking member that is directed to the present connector according Example No. 1, wherein FIG. 8(a) is a front view and FIG. 8(b) is a cross-sectional view that is taken in the directions of arrows "8(b)"-"8(b)" designated in FIG. 8(a).

FIG. 25 is diagrams for illustrating a checking member that is directed to the present connector according Example No. 3, wherein

DETAILED DESCRIPTION OF THE PREFERRED EMBODIMENTS

Figure 1:
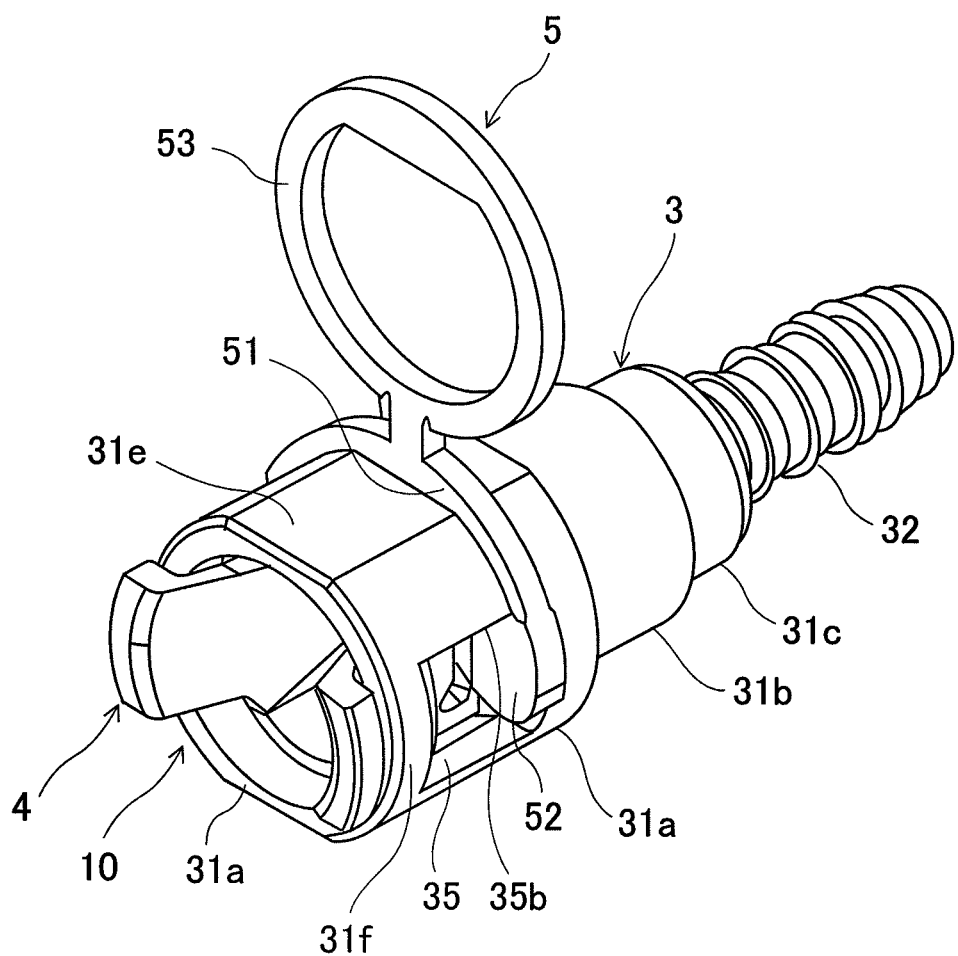
FIG. 1 is a perspective view for illustrating a connector that is directed to Example No. 1 according to the present invention.
Figure 2:
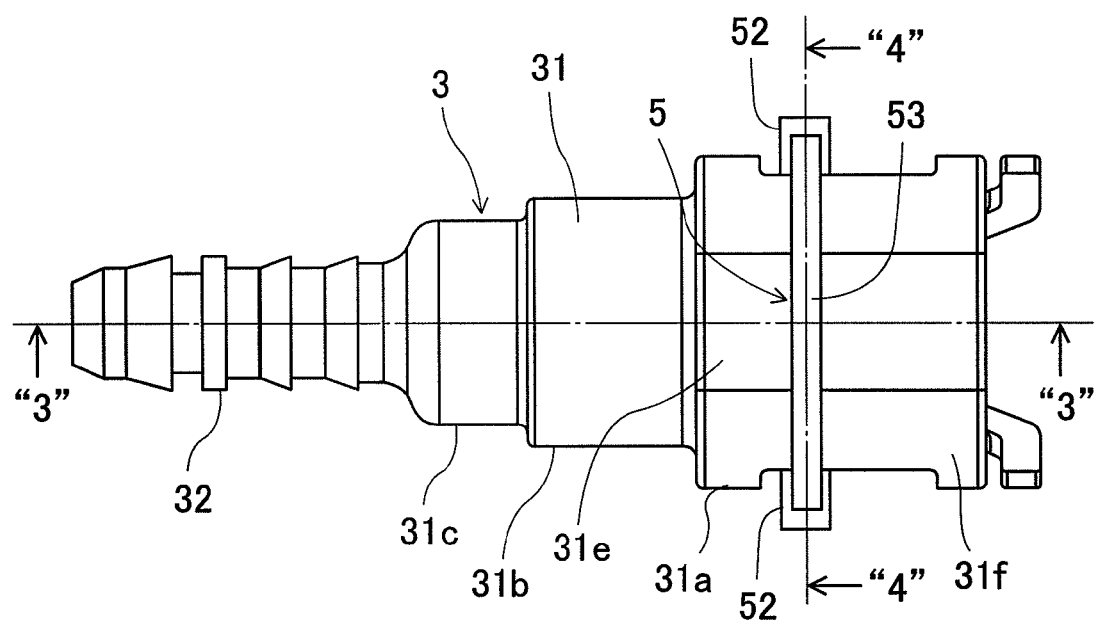
FIG. 2 is a plan view for illustrating the present connector that is directed to Example No. 1.
Figure 3:
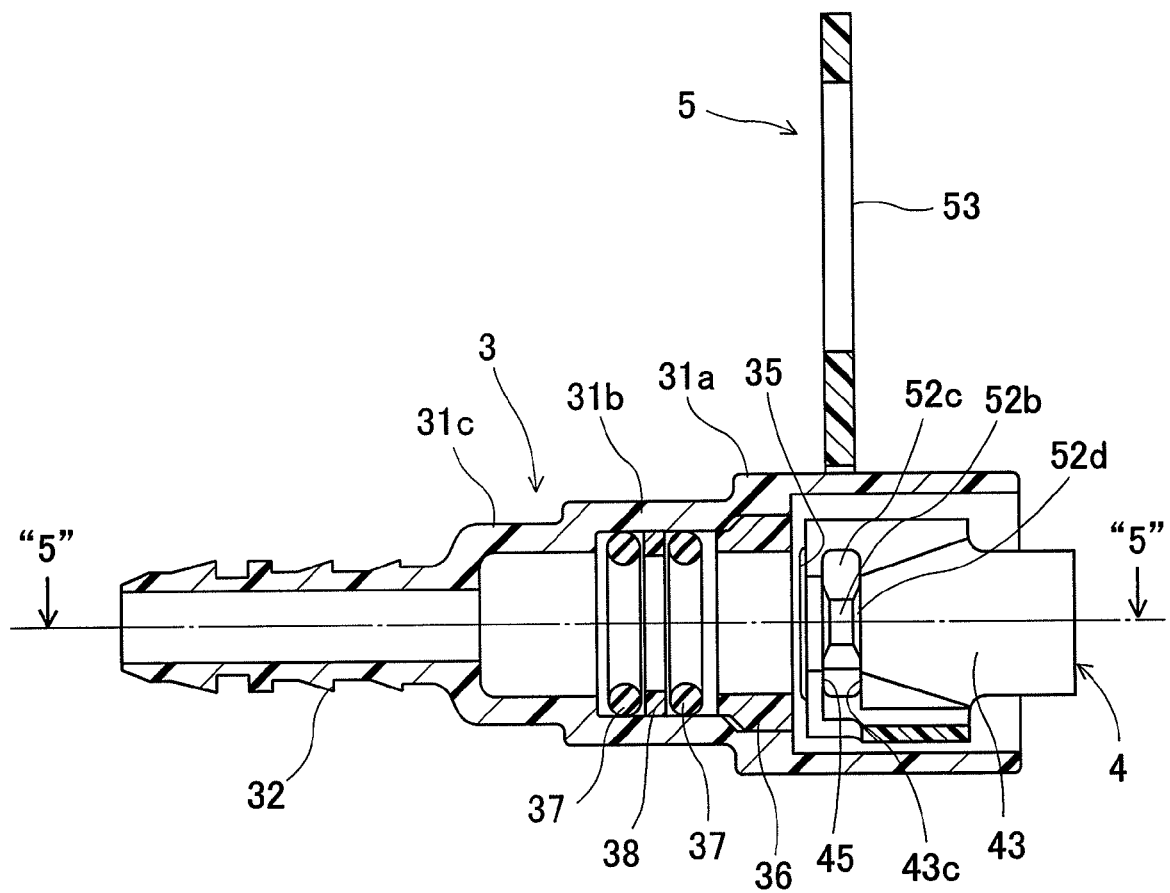
FIG. 3 is an axial cross-sectional view for illustrating the present connector that is directed to Example No. 1, axial cross-sectional view which is taken in the directions of arrows "3"-"3" designated in FIG. 2.

Having generally described the present invention, a further understanding can be obtained by reference to the specific preferred embodiments which are provided herein for the purpose of illustration only and not intended to limit the scope of the appended claims.

EXAMPLES

Hereinafter, connectors according to examples of the present invention will be described based on the drawings.

Example No. 1

A connector according to Example No. 1 of the present invention will be described with reference to FIGS. 1 through 13. The present connector according to Example No. 1 is a connector that is coupled to or connected to a cylindrical male member 1, and comprises a female member 10 and a checking member 5. The female member 10 has a cylindrical portion that comprises a female-member body 3 and a locking member 4. The checking member 5 is assembled outward with and retained onto the female-member body 3, and is for checking whether the male member 1 is coupled to the female member 10. The respective constituent parts will be detailed hereinafter.

Figure 10:
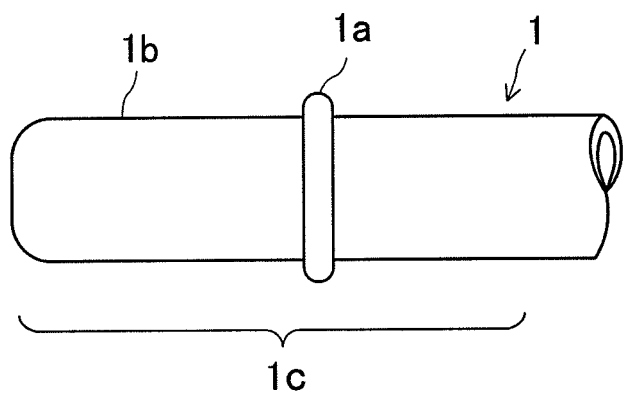
FIG. 10 is a front view for illustrating a male member that is directed to the present connector according to Example No. 1.

The male member 1 is made of a metallic or resinous pipe. As illustrated in FIG. 10, the male member 1 has an insertion end 1c. The insertion end 1c is provided with a ring-shaped protrusion 1a and a leading end 1b. The ring-shaped protrusion 1a is disposed at a position that is separated away from the axial leading end by a predetermined distance, and is formed so as to protrude in the centrifugal direction. The leading end 1b is a section that is placed on the leading end side ahead of the ring-shaped protrusion 1a.

The female-member body 3 is made from resin, such as polyamide (or PA), for instance. As illustrated in FIGS. 1 through 7 and FIGS. 11 through 13, the female-member body 3 comprises a housing 31, and a hose connector end 32. The housing 31 is disposed on one of the axially opposite ends of the female-member body 3, namely, on the right side in FIGS. 2, 3, 5, 6 and 7 (being the same hereinafter unless otherwise specified). The hose connector end 32 is disposed coaxially with the housing 31 on the other one of the axially opposite ends of the female-member body 3, namely, on the left side in FIGS. 2, 3, 5, 6 and 7 (being the same hereinafter unless otherwise specified).

The housing 31 comprises a major-diameter portion 31a, an intermediate-diameter portion 31b and a minor-diameter portion 31c that are disposed coaxially to each other in this order from the one of the axially opposite ends to the other. The housing 31 is provided with an insertion opening end 31d, into which the insertion end 1c of the male member 1 is inserted, at one of the opposite ends, namely, at the one of the axially opposite ends. Moreover, the inner peripheral surface of the hose connector end 32 makes an axial hole, and the outer peripheral surface of the hose connector end 32 is provided with a plurality of annular grooves and steps that inhibit a hose 2 (see FIG. 11) from coming off. In addition, the hose 2 is assembled outward with the outer peripheral surface of the hose connector end 32 by press fitting, and is then fastened onto it. Note that the hose 2 can be rubber hoses or resinous tubes, for instance.

Figure 4:
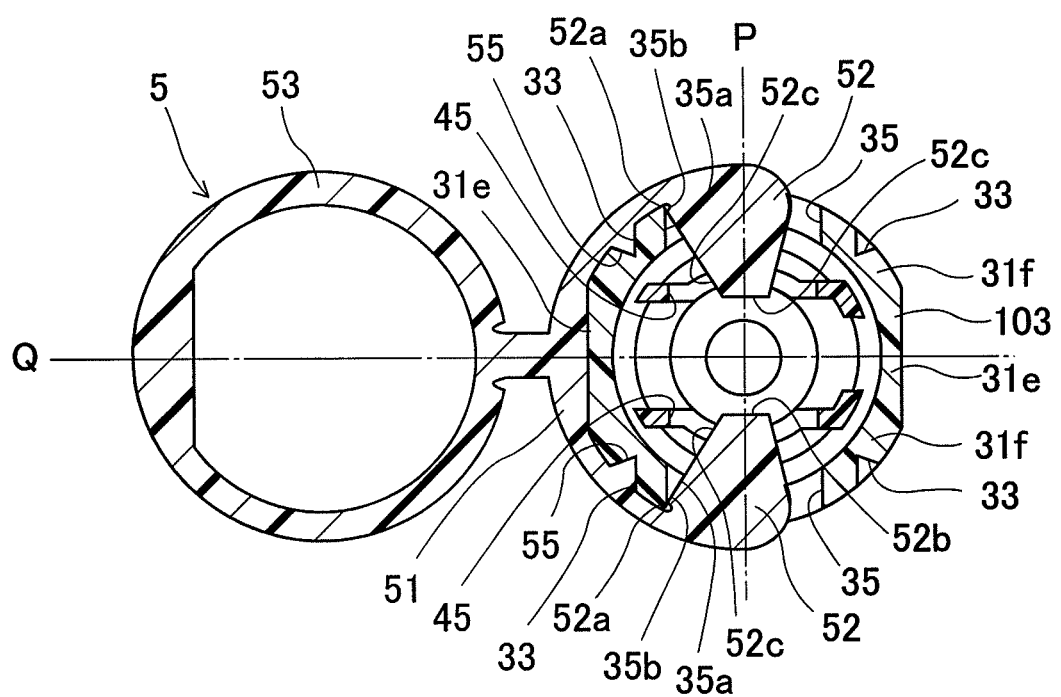
FIG. 4 is an axially-perpendicular cross-sectional view for illustrating the present connector that is directed to Example No. 1, axially-perpendicular cross-sectional view which is taken in the directions of arrows "4"-"4" designated in FIG. 2.
Figure 12:
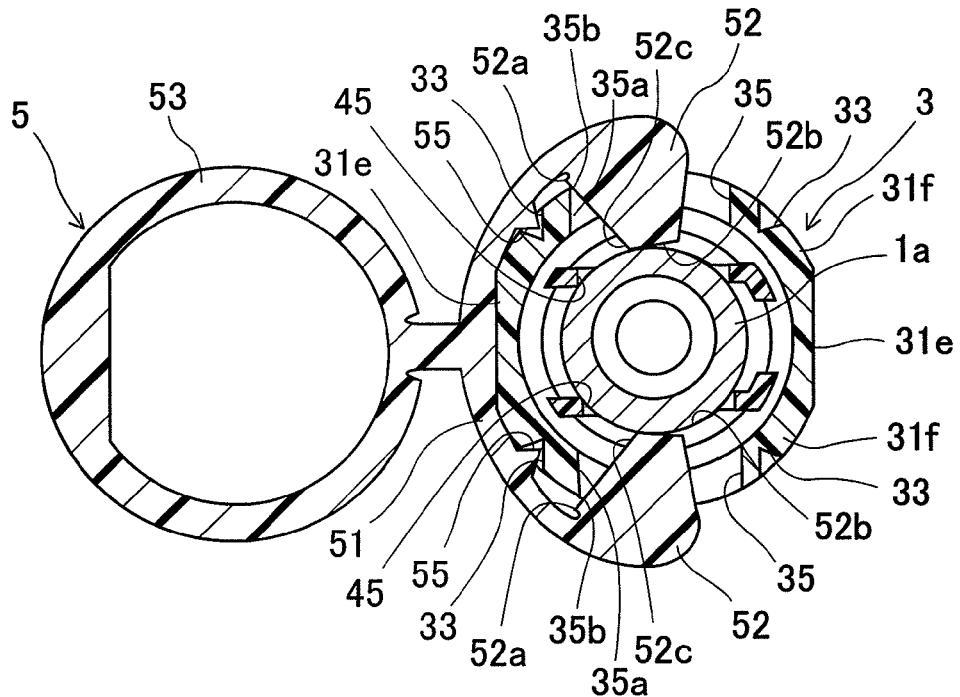
FIG. 12 is another cross-sectional view for illustrating the present connector according to Example No. 1 when the male member is inserted into the female member completely, another cross-sectional view which is taken in the directions of arrows "12"-"12" designated in FIG. 11.
Figure 13:
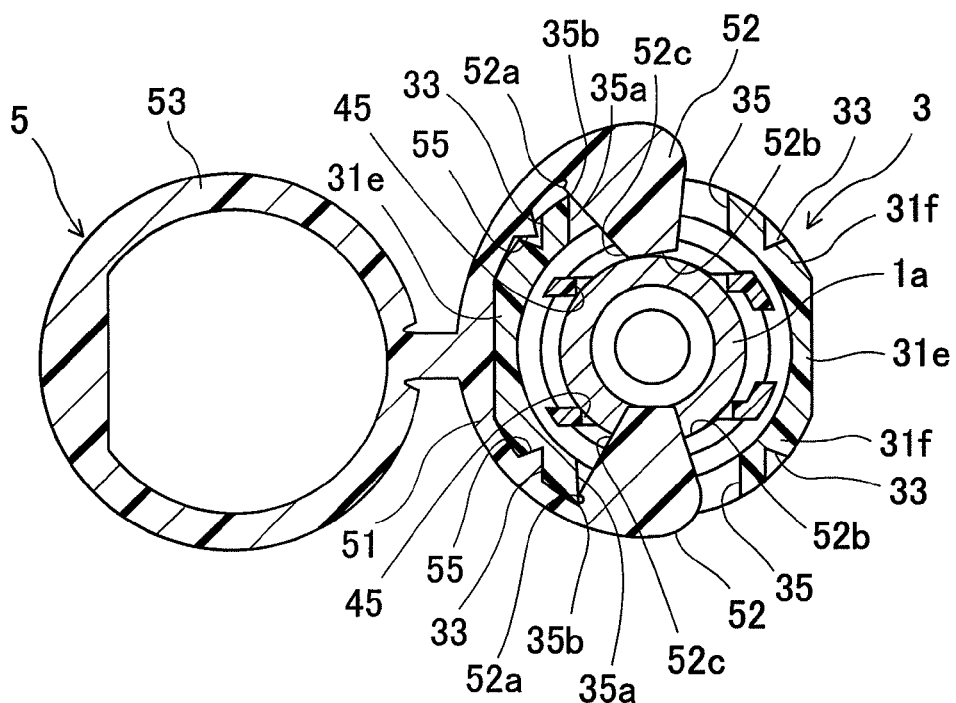
FIG. 13 is still another cross-sectional view for illustrating the present connector according to Example No. 1 when the male member is inserted into the female member obliquely, still another cross-sectional view which is taken in the directions of arrows "13"-"13" designated in FIG. 11.
Figure 14:
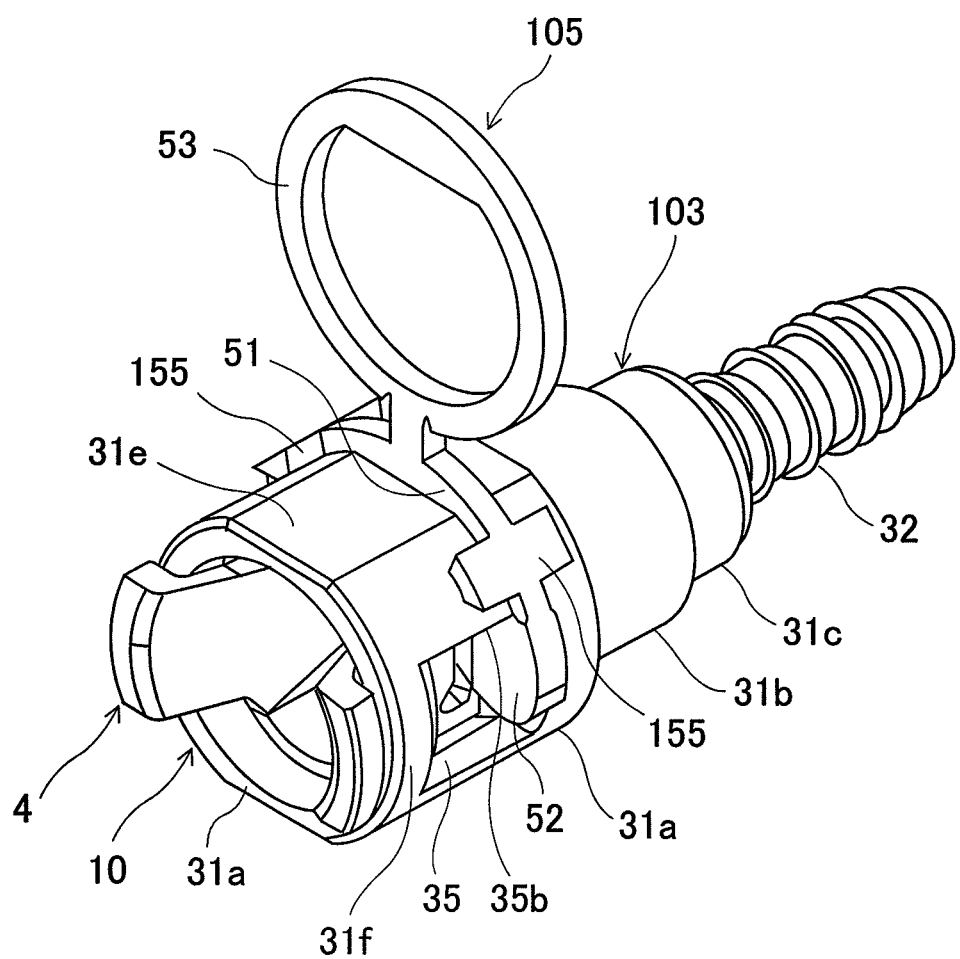
FIG. 14 is a perspective view for illustrating a connector that is directed to Example No. 2 according to the present invention.
Figure 15:
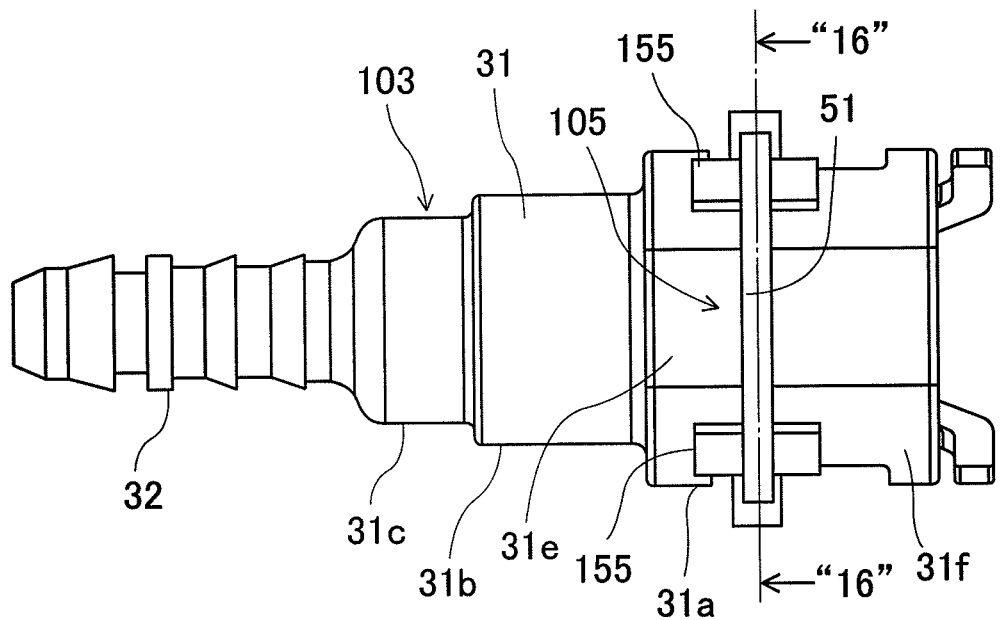
FIG. 15 is a plan view for illustrating the present connector that is directed to Example No. 2.

One of the sections of the housing 31, namely, the major-diameter portion 31a, comprises paired flat walls 31e, 31e, and paired arc walls 31f, 31f, as shown in FIGS. 4, 12 and 13. The flat walls 31e, 31e extend parallel to each other in the axial direction. The arc walls 31f, 31f connect the lower ends of one of the flat walls 31f, 31f integrally with the upper ends of the other one of the flat walls 31e, 31e, respectively. Moreover, each of the arc walls 31f, 31f is provided with a rectangle-shaped window 35 in the circumferentially central section. The paired windows 35, 35 are formed to penetrate the arc walls 31f, 31f radially, and are disposed in the circumferential direction so as to face each other.

Figure 6:
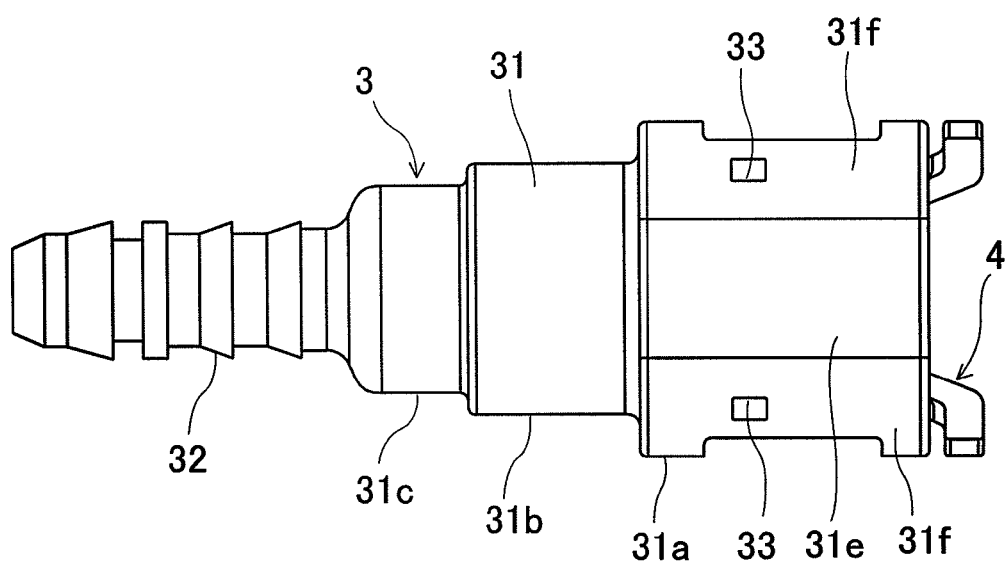
FIG. 6 is a plan view for illustrating a female member that is directed to the present connector according to Example No. 1.
Figure 7:
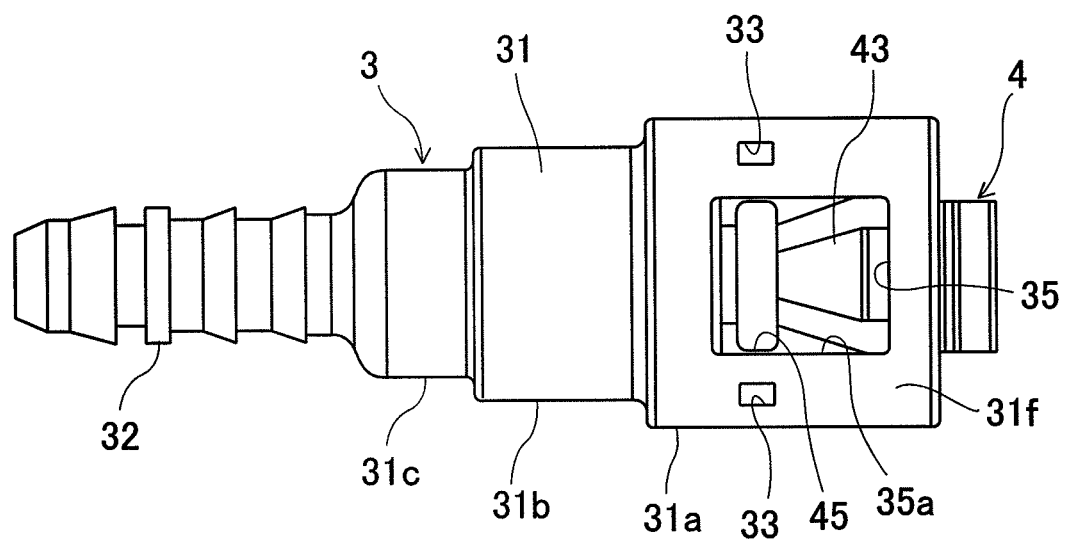
FIG. 7 is a front view for illustrating the female member that is directed to the present connector according to Example No. 1.

The arc walls 31f, 31f are provided with a set of two fitting dents 33, 33, respectively, namely, four of the fitting dents 33, 33 in total for the female-member body 3's housing 31 as a whole. The fitting dents 33, 33, are disposed on both side of the windows 35, 35 so as to held the windows 35, 35 between them in the circumferential direction. The fitting dents 33, 33 make a dented groove that has a letter "V"-shaped axially-perpendicular cross section and extends in the axial direction, respectively. As illustrated in FIGS. 6 and 7, the fitting dents 33, 33 are disposed adjacent to the other one of the axially opposite ends of the windows 35, 35, namely, on the left side in the drawings. Moreover, the fitting dents 33, 33 make a non-penetrating depression that does not penetrates through the arc walls 31f, 31f to the inner peripheral surface of the housing 31. That is, the fitting dents 33, 33 open in the outer peripheral surface of the housing 31 alone. To put it differently, the fitting dents 33, 33 do not penetrate through the arc walls 31f, 31f over from the outer peripheral surface of the housing 31 to the inner peripheral surface.

Note that the fitting dents 33, 33 . . . are disposed in a quantity of two for each of the arc walls 31f, 31f in order to make it possible to cope with situations where an assembly-line worker or robot attaches the checking member 5 onto the housing 31 from any one of the sides, namely, from the upper side or lower side with respect to the housing 31 in FIGS. 6 and 7.

Here, in the axially-perpendicular cross section of the housing 31 of the female-member body 3, let us label an imaginary central axis, which extends parallel to the facing direction of the windows 31, 31 that are disposed to face mutually, a first symmetric axis "P" (see FIG. 4), and let us label an imaginary axis, which cross the first symmetric axis "P" perpendicularly, a second symmetric axis "Q." In this instance, the flat walls 31e, 31e extend parallel to the first symmetric axis "P." Moreover, the two sets of the circumferentially opposite ends 35a, 35a of the windows 35, 35 make facing parallel planes that extend parallel to the first symmetric axis "P." The windows 35, 35 are formed symmetrically with respect to the second symmetric axis "Q" as well. These settings form the section of the housing 31 that makes the major-diametric portion 31a (i.e., the female-member body 3 including the housing 31) as a shape that is not only symmetric with respect to the first symmetric axis "P" but also symmetric with respect to the second symmetric axis "Q." Moreover, the checking member 5 is forms as a symmetric shape with respect to the second symmetric axis "Q" as will be described later. As a result, it is feasible for an assembly-line worker or robot to attach the checking member 5 onto the housing 31 either from the right side with respect to the housing 31 in FIG. 4 or from the left side.

Inside the intermediate-diameter portion 31b, a long-cylindrical collar 36, a ring-shaped seal 37, a short-cylindrical collar 38, and another ring-shaped seal 37 are disposed on the inner peripheral surface in this order from the one of the axially opposite ends to the other. The ring-shaped seal 37 seals the outer peripheral surface of the leading end 1b of the male member 1's insertion end 1c that is inserted into the female-member body 3's housing 31. The other ring-shaped seal 37 likewise seals the outer peripheral surface of the leading end 1b of the male member 1's insertion end 1c. Moreover, the inner peripheral surface of the minor-diameter portion 31c makes a ring-shaped fitting inner peripheral surface that fits onto the outer peripheral surface of the leading end 1b of the male member 1's insertion end 1c that is inserted into the female-member body 3's housing 31.

Figure 9:
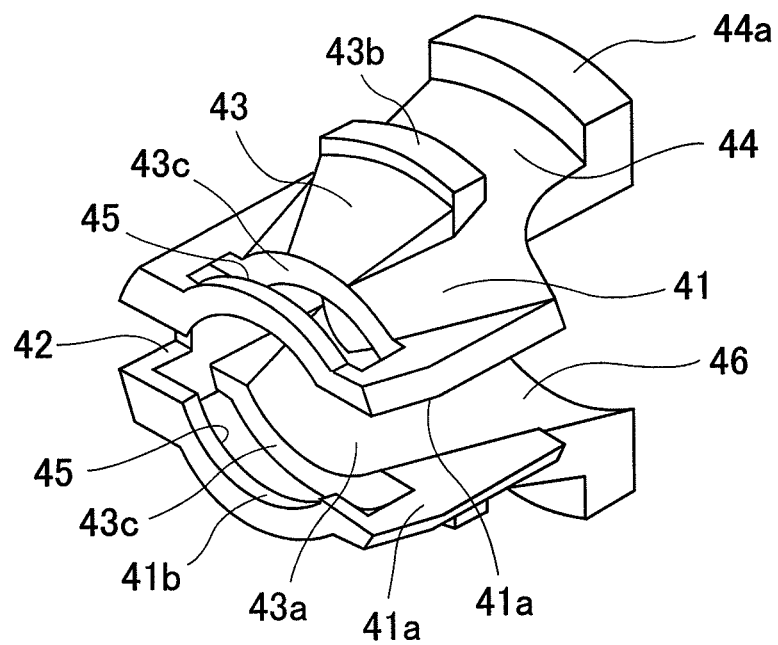
FIG. 9 is perspective view for illustrating a locking member that is directed to the present connector according to Example No. 1.

The locking member 4 is made from resin that is capable of deforming elastically, such as polyamide (or PA), for instance. The locking member 4 is inserted into the major-diameter portion 31a of the female-member body 3's housing 31, and is then retained in it. As illustrated in FIG. 9, the locking member 4 comprises a body 41. The body 41 is formed as a cross-sectionally "C" configuration or letter "C" shape (namely, an annular shape virtually) that provides a relatively large clearance for deformation between the circumferentially opposite ends 41a, 41a. Except the sections that face the clearance for deformation, the inner surface of the body 41 is formed in such a manner that reduces diametrically from the one of the axially opposite ends to the other one of the axially opposite ends (namely, to the axially inner side of the female-member body 3's housing 31). Specifically, other than the sections that face the clearance for deformation, the body 41 is formed so as to have a reducing inside diameter that reduces from a major inside diameter, which is substantially equal to the outside diameter of the male member 1, to a minor inside diameter, which is smaller than the outside diameter of the male member 1's ring-shaped protrusion 1a, at the axially opposite end 41b (namely, the other one of the axially opposite ends). Moreover, the inner surface of the body 41's section, which faces the clearance for deformation, is formed as a cylindrical inner surface virtually. In addition, the body 41's section, which faces the clearance for deformation, is provided with a cut-off dent 42 at the opposite end 41b (namely, the other one of the axially opposite ends).

Moreover, the body 41 is provided with paired claws 43, 43 at the radially symmetric positions. The claws 43, 43 protrude outward diametrically. The claws 43, 43 have an inclined inner surface 43a, a locking step 43b, and a locking end 43c, respectively, as shown in FIG. 9. When the locking member 4 is inserted into and is then retained in the female-member body 3's housing 31, the inclined inner surfaced 43a inclines inward radially as they come from the housing 31's insertion opening end 31d toward the axially inner side. The inclined inner surfaces 43a, 43a are formed as an arc shape in the diametrically cross section, respectively. In addition, the male member 1's ring-shaped protrusion 1a not only presses the inclined inner surfaces 43a, 43a outward radially but also comes in contact with the inclined inner surfaces 43a, 43a slidingly when an assembly-worker or robot inserts the male member 1 into the female-member body 3.

The locking steps 43b, 43b of the locking member 4's body 41 lock to the axially opposite ends of the windows 35, 35 in the female-member body 3's housing 31, thereby inhibiting the locking member 4 from being pulled out of the housing 31. Meanwhile, the locking ends 43c, 43c of the locking member 4's body 41 lock to the male member 1's ring-shaped protrusion 1a when an assembly-line worker or robot couples or connects the male member 1 to the female-member body 3, thereby inhibiting the male member 1 from being pulled out of the female-member body 3. Note that the claws 43, 43 are provided with slits 45, 45, which face each other, on the other one of the axially opposite ends. The male member 1's ring-shaped protrusion 1a goes into the slits 45, 45 when an assembly-line worker or robot couples or connects the male member 1 to the female-member body 3. Moreover, the slits 45, 45 make the locker ends 43c, 43c, which inhibit the male member 1 from being pulled out of the female-member body 3, at the one of the axially opposite ends.

In addition, the body 41 of the locking member 4 is provided with paired manipulator arms 44, 44 integrally at the one of the axially opposite ends. The manipulator arms 44, 44 extend from positions, which correspond to the claws 43, 43, toward the one of the axially opposite ends while inclining outward diametrically. The manipulator arms 44, 44 are provided with manipulator ends 44a, 44a that protrude outward diametrically. The manipulator arms 44, 44 have inner surfaces 46, 46 that are formed as an arc shape in the cross section, respectively. Specifically, the inner surfaces 46, 46 are formed as such a tapered shape virtually that is connected with the inclined inner surface 43a continuously and is inclined from the locking member's center toward the other one of the axially opposite ends in the central axis direction. Moreover, when an assembly-line worker or robot inserts the male member 1 into the body 41 of the locking member 4 from the side of the manipulator ends 44a, 44a of the manipulator arms 44, 44, the inner surfaces 46, 46 and inclined surfaces 43a, 43a are formed so as to make the male member 1's ring-shaped protrusion 1a come in contact with the inner surfaces 46, 46 or with the inclined surfaces 43a, 43a. Note that the locking member 4 is held in the female-member body 3's housing 31 but is retained movably relatively with respect to the housing 31 in the axial direction, taking into consideration the readiness of inserting the locking member 4 into the housing 31.

Figure 8A:
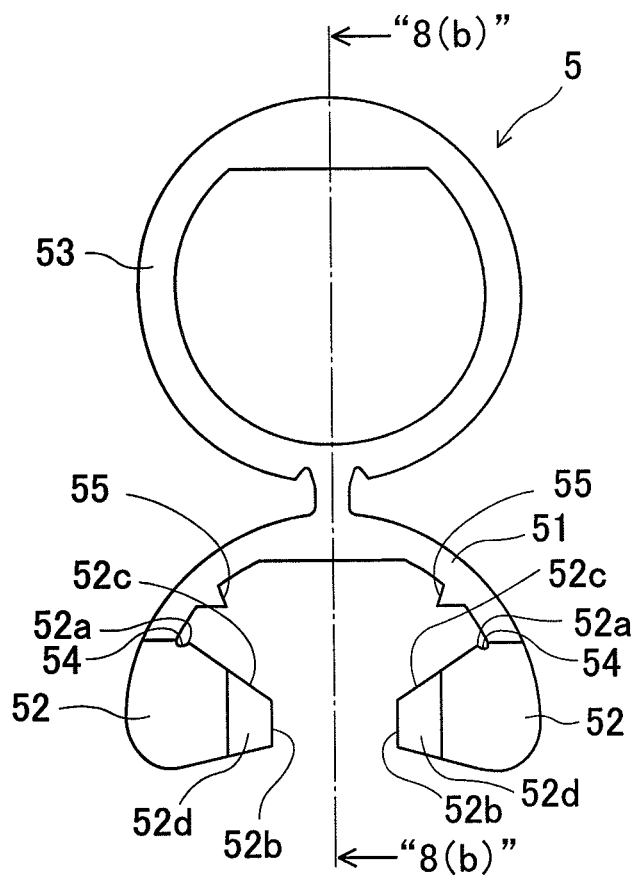
Figure 8B:
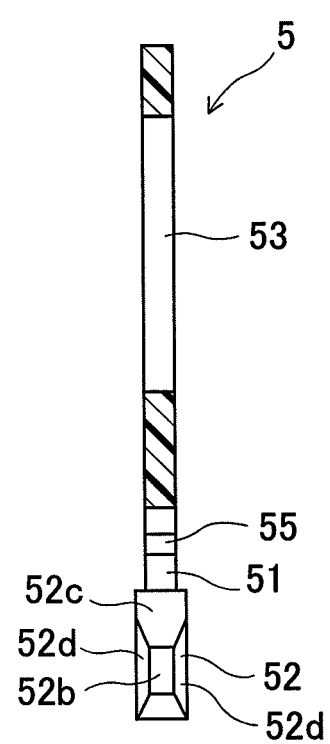

As illustrated in FIG. 8, the checking member 5 comprises a letter "C"-shaped portion 51, paired locker protrusions 52, 52, a knob 53, and paired fitting protrusions 55, 55 that are made from resin integrally. The letter "C"-shaped portion 51 is formed as a shape that is capable of undergoing elastic deformation to expand diametrically. The paired locker protrusions 52, 52 protrude inwardly from and integrally with the opposite ends of the letter "C"-shaped portion 51. The knob 53, which is formed as a ring shape, protrudes outward radially from and integrally with the circumferentially central section of the letter "C"-shaped portion 51. When an assembly-line worker or robot pulls the checking member 5 from out of the female-member body 3's housing 31, the assembly-line worker or robot picks up the knob 53 with the hand or fingers to exert pull-out force on the knob 53.

The fitting protrusions 55, 55 of the checking member 5 fit into the fitting dents 33, 33 . . . in the female-member body 3's housing 31. The fitting protrusions 55, 55 are disposed on one of the opposite sides of the letter "C"-shaped portion 51 with respect to the circumferentially central section, and on another one of the opposite sides, respectively. To be concrete, the fitting protrusions 55, 55 are disposed at two locations, namely, at an intermediate position between one of the opposite ends of the letter "C"-shaped portion 51 and the circumferentially central section, and at another intermediate position between another one of the opposite ends and the circumferentially central section. Moreover, the fitting protrusions 55, 55 are disposed in a quantity of one for each of the intermediate positions so as to protrude inwardly from the inner peripheral surface of the letter "C"-shaped portion 51 to the axially opposite ends, respectively. The fitting protrusions 55, 55 are formed as a shape and size that coincide with those of the fitting dents 33, 33 . . . , respectively. Specifically, the fitting protrusions 55, 55 have a triangular cross section that coincides with the letter "V"-shaped cross-sectional shape of the fitting dents 33, 33 . . . , respectively. Note herein that the term, "coinciding," means that the fitting protrusions 55, 55 and the fitting dents 33, 33 . . . fit snugly to each other. That is, the term means that the fitting protrusions 55, 55 and the fitting dents 33, 33 . . . have a shape, which enables them to fit to each other in such a state that they contact each other over the entire surfaces, respectively.

Note that, as can be seen from FIG. 8, the checking member 5 is formed as a symmetric shape whose axis of symmetry is an imaginary center line that passes the circumferential middle of the letter "C"-shaped portion 51 and the center between the locker protrusions 52, 52. That is, the checking member 5 is symmetric with respect to the alternate long and dash line that is perpendicular to the arrows "8(b)"-"8(b)" designated in FIG. 8.

When an assembly-line worker or robot puts the checking member 5 in a state in which the letter "C"-shaped portion 51 is expanded diametrically by elastic deformation, the assembly-line worker or robot can attach the checking member 5 onto the female-member body 3's housing 31 by inserting the locker protrusions 52, 52, which are disposed at the opposite ends of the letter "C"-shaped portion 51, into the windows 35, 35 in the housing 31, as shown in FIG. 4, for instance. Since the inner peripheral shape of the letter "C"-shaped portion 51 corresponds to the outer peripheral shape of the housing 31's major-diameter portion 31a substantially, the inner peripheral surface of the letter "C"-shaped portion 51 is press contacted with the outer peripheral surface of the major-diameter portion 31a to come in close contact with each other (will be described later) when the checking member 5 is assembled outward with and retained onto the housing 31. When the checking member 5 is attached onto the housing 31, the fitting protrusions 55, 55, with which the letter "C"-shaped portion 51 is provided, fit into two of the fitting dents 33, 33 . . . , with which the housing 31's arc walls 31f, 31f are provided.

Note herein that the fitting protrusions 55, 55 are formed as the triangular shape whose size coincides with that of the letter "V"-grooved fitting dents 33, 33, as described above. Thus, the fitting protrusions 55, 55, and the fitting dents 33, 33 are put in such a state that the circumferentially opposite side surfaces of the fitting protrusions 55, 55 contact the circumferentially opposite side surfaces of the fitting dents 33, 33, and in such a state that the axially opposite side surfaces of the fitting protrusions 55, 55 contact the axially opposite side surfaces of the fitting dents 33, 33.

The locker protrusions 52, 52 have a first locker 52a, a leading-end contact 52b, and an inclined second locker 52c, respectively. Before the male member 1 is coupled to the female member 10 (or before it is inserted into the female-member body 3 and locking member 4), the first lockers 52a, 52a lock to the circumferentially opposite ends 35a, 35a of the windows 35, 35, thereby inhibiting the checking member 5 from being pulled out of the housing 31 in the axially perpendicular direction, namely, in the direction of the axis of symmetry "Q" designated in FIG. 4 (being the same hereinafter).

Moreover, before the male member 1 is coupled to the female member 10, the leading-end contacts 52b, 52b are placed within the locus of the male member 1's ring-shaped protrusion 1a upon inserting the male member 1. Then, when the male member 1 is inserted into the female member 10 completely, the leading-end contacts 52b, 52b are pressed by the ring-shaped protrusion 1a to move outward radially, thereby expanding the checking member 5's letter "C"-shaped portion 51 diametrically.

In addition, when the male member 1 is inserted into the female member 10 completely, the inclined second lockers 52c, 52c lock to the circumferentially opposite rims 35b, 35b of the windows 35, 35, and thereby the letter "C"-shaped portion 51 of the checking member 5 exerts elastic restoring force to inhibit the checking member from being come off from the major-diameter portion 31a of the female-member body 3's housing 31 in the axially perpendicular direction. Moreover, when an assembly-line worker or robot pulls the checking member 5 out of the housing 31 in the axially perpendicular direction after the male member 1 is inserted into the female member completely, the inclined second lockers 52c, 52c, which extend toward the centripetal direction of the housing 31, furthermore expand the letter "C"-shaped portion 51 diametrically by means of coming in sliding contact with the circumferentially opposite rims 35b, 35b of the windows 35, 35.

Figure 5:
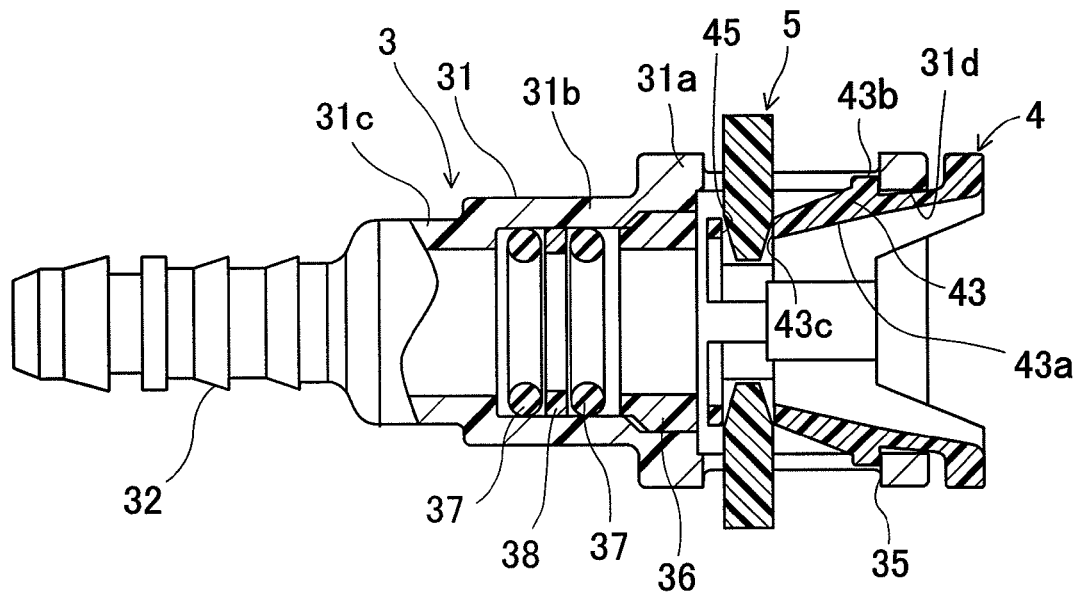
FIG. 5 is another axial cross-sectional view for illustrating the present connector that is directed to Example No. 1, another axial cross-sectional view which is taken in the directions of arrows "5"-"5" designated in FIG. 3.

Note that, in such a state that the checking member 5 is assembled outward with and retained onto the female-member body 3's housing 31, the checking member 5's locker protrusions 52, 52 are placed at positions that are more adjacent to the other axially opposite end of the housing 31 than the locking steps 43b, 43b of the locking member 4's claws 43, 43 are present, as shown in FIG. 5. At the positions, the locker protrusions 52, 52 are inserted into the housing 31 through the windows 35, 35, respectively. To be concrete, the locker protrusions 52, 52 are placed at the axial positions where the locking member 4 is provided with the slits 45, 45, and are then inserted into the housing 31 through the windows 35, 35 via the locking member 4's slits 45, 45, respectively. Moreover, in the present connector according to Example No. 1, the leading-end contacts 52b, 52b of the locker protrusions 52, 52 go into the housing 31 to such positions that they can make sliding contact with the outer peripheral surface of the leading end 1b of the male member 1 to be inserted into the female member 10 before the checking member 5 is assembled outward with and retained onto the housing 31 and the male member 1 is coupled to the female member 10. That is, the leading-end contacts 52b, 52b of the locker protrusions 52, 52 have passed through the slits 45, 45 of the locking member 4 from the outside to the inside.

In addition, in the present connector according to Example No. 1, the locker protrusions 52, 52 are provided with the dent-shaped cut-off 54 (see FIG. 8(a)) at the base end (namely, the boundary between the locker protrusions 52, 52 and the letter "C"-shaped portion 51) on the side of the letter "C"-shaped portion 51 (namely, their upper side in FIG. 8), respectively. The boundary between the cut-off 54 and the inclined second locker 52c makes the first locker 52a. Moreover, the dimensions of the letter "C"-shaped portion 51 and housing 31 are set up so that the distance between the line, which connects the circumferentially opposite ends of the windows 35, 35 with each other, and the outer surface of the housing 31's flat portion 31e is slightly larger than the distance between the line, which connects the first lockers 52a, 52a with each other, and the inner surface of the letter "C"-shaped portion 51's flat portion.

In the present connector according to Example No. 1 that is constructed as described above, the letter "C"-shaped portion 51b of the checking member 5 undergoes elastic deformation slightly when the checking member 5 is assembled outward with and retained onto the female-body member 30's housing 31, namely, when the first lockers 52a, 52a of the checking member 5's locker protrusions 52, 52 are locked to the circumferentially opposite ends 35a, 35a of the windows 35, 35 in the housing 31. The resulting elastic force acts on the first lockers 52a, 52a as force that presses the first lockers 52a, 52a onto the circumferentially opposite ends 35a, 35a of the windows 35, 35 in the substantially perpendicular direction. As a result, the side wall of the housing 31's major-diameter portion 31a to which the checking member 5 is attached is held between the first lockers 52a, 52a of the checking member 5 and the inner surface of the letter "C"-shaped portion 51 of the checking member 5 in the axially perpendicular direction. That is, the side wall of the major-diameter portion 31, with which the inner surface of the letter "C"-shaped portion 51 contacts closely in press contact manner, is held between the first lockers 52a, 52a and the letter "C"-shaped portion 51's inner surface in the axially perpendicular direction.

Thus, the checking member 5 is retained onto the female-member body 30's housing 31 firmly and securely. Moreover, not only the checking member 5 is prevented from idling relatively to the housing 31, but also it is made impossible to pull the checking member 5 from out of the housing 31 readily even when an assembly-line worker or robot tries to do so.

Note that the following are not the essential requirements of the present invention: forming the cut-offs 54, 54 in the checking member 5's letter "C"-shaped portion 51; and designing the dimensions so that the letter "C"-shaped portion 51 undergoes elastic deformation slightly when the checking member 5 is assembled outward with and retained onto the female-member body 3's housing 31. However, in the case where the letter "C"-shaped portion 51 undergoes elastic deformation slightly when the checking member 5 is assembled outward with and retained onto the female-member body 3's housing 31, it is desirable to provide the letter "C"-shaped portion 51 with the cut-offs 54, 54. This is because the elastic restoring force of the letter "C"-shaped portion acts in such a direction as expanding the letter "C"-shaped portion by way of the locking between first lockers 52a, 52a and the circumferentially opposite ends 35a, 35a of the windows 35, 35 when no cut-offs 54, 54 are formed in the letter "C"-shaped portion 51, and consequently because the checking member 5 becomes likely to come off from the housing 31.

Moreover, in the present connector according to Example No. 1, the opposite side surfaces of the locker protrusions 52, 52 make the tapered surfaces 52d, 52d, in which the interval between them narrows down as they go toward the leading end, on the leading-end side. Accordingly, at the time of inserting the male member 1 into the female member 10, the male member 1's ring-shaped protrusion 1a becomes likely to go into the inside of the leading-end contacts 52, 52 of the checking member 5's letter "C"-shaped portion 51b because the ring-shaped protrusion 1a comes in sliding contact with and is then guided by the tapered surfaces 52d, 52d. Consequently, the ring-shaped protrusion 1a makes the leading-end contacts 52b, 52b likely to move outward in the radial direction.

The present connector according to Example No. 1 that is constructed as described above comprises the checking member 5 that is assembled outward with and retained onto the female-member body 3's housing 31, as illustrated in FIGS. 1 through 5, before the male member 1 is coupled to the female member 10. On this occasion, the locker protrusions 52, 52 of the checking member 5 are placed at positions that are more adjacent to the axially opposite end of the housing 31 than the locking steps 43b, 43b of the locking member 4's claws 43, 43 are present. Then, not only the locker protrusions 52, 52 are inserted into the housing 31 through the windows 35, 35 at the positions, but also they lock to the circumferentially opposite ends of the windows 35, 35. Thus, it is possible to inhibit the checking member 5 reliably from being pulled out of the housing 31 in the axially perpendicular direction, because the first lockers 52a, 52a of the locker protrusions 52, 52 lock to the circumferentially opposite ends of the windows 35, 35. That is, under the circumstances, an assembly-line worker or robot cannot pull the checking member 5 from out of the housing 31 in the axially perpendicular direction even when the assembly-line worker or robot tries to do so. Moreover, under the circumstances, the leading-end contacts 52b, 52b of the locker protrusions 52, 52 are located within the locus of the male member 1's ring-shaped protrusion 1a upon inserting the male member 1 into the female member 10.

In addition, when an assembly-line worker or robot inserts the insertion end 1c of the male member 1 into the female-member body 3's housing 31 through the insertion opening end 31d, the ring-shaped protrusion 1a of the male member 1 expands the locking member 4's claws 43, 43 outward in the radial direction against the elasticity of the claws 43, 43 because the ring-shaped protrusion 1a presses and then comes in sliding contact with the inclined inner surfaces 43a, 43a of the claws 43, 43. Then, the ring-shaped protrusion 1a goes past the claws 43, 43. As a result, the claws 43, 43 recover inward elastically in the radial direction. Thus, the locking ends 43c, 43c of the claws 43, 43 lock to the ring-shaped protrusion 1a, and thereby the male member 1 is coupled to the female-member body 3 by way of the locking member 4.

Figure 11:
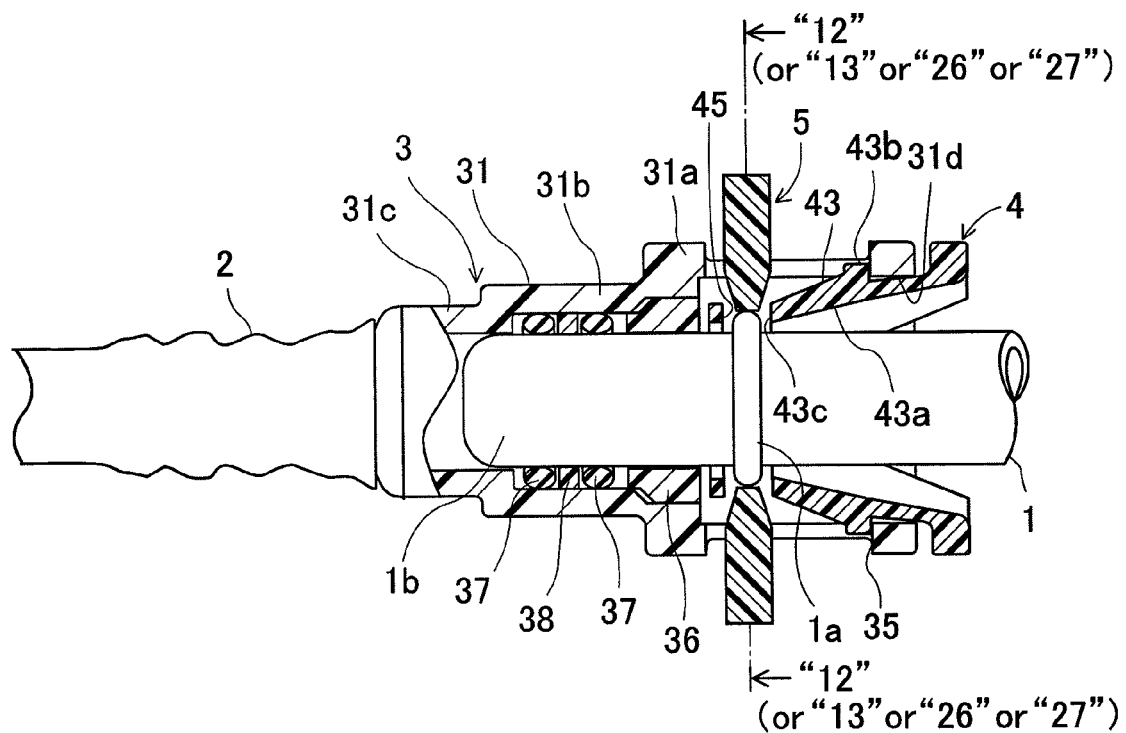
FIG. 11 is a cross-sectional view for illustrating the present connector according to Example No. 1 when the male member is inserted into the female member completely.

When the male member 1 is inserted into the female member 10 completely, the male member 1's ring-shaped protrusion 1a presses the leading-end contacts 52b, 52b of the checking member 5's locker protrusions 52, 52, which have been located within the locus of the ring-shaped protrusion 1a, to move them outward in the radial direction, respectively, as illustrated in FIGS. 11 and 12. Thus, the ring-shaped protrusion 1a expands the checking member 5's letter "C"-shaped portion 51 diametrically. When the letter "C"-shaped portion 51 is thus expanded diametrically, the second inclined lockers 52c, 52c of the letter "C"-shaped portion 51's locker protrusions 52, 52 come in contact with and are then locked to the circumferentially opposite rims 35b, 35b of the windows 35, 35 in the housing 31, respectively, as illustrated in FIG. 12. Thus, the elastic restoring force of the letter "C"-shaped portion is inhibited from removing the checking member 5 from the housing 31 in the axially perpendicular direction, because the inclined second lockers 52c, 52c of the locker protrusions 52, 52 lock to the circumferentially opposite rims 35b, 35b of the windows 35, 35.

When an assembly-line worker or robot tries to pull the checking member 5 from out of the female-member body 3's housing 31 in the axially perpendicular direction under the circumstances, the inclined second lockers 52c, 52c of the locker protrusions 52, 52 contact slidingly with the circumferentially opposite rims 35b, 35b of the windows 35, 35. Accordingly, the checking member 5's letter "C"-shaped portion 51 is expanded furthermore diametrically. Consequently, the assembly-line worker or robot can readily pull the checking member 5 from out of the housing 31. Thus, the assembly-line worker or robot can confirm the coupling between the male member 1 and the female member 10.

Moreover, the following case will be described with reference to FIG. 13: that is, in the present connector according to Example No. 1, in a case where the male member 1's insertion leading end 1c is inserted into the female-member body 3's housing 31 in such a manner that it is inclined toward one of the locker protrusions 52, 52 of the checking member 5's letter "C"-shaped portion 51 when an assembly-line worker or robot inserts the insertion end 1c into the housing 31. In this instance, the male member 1's insertion end 1c makes a contact with one of the locker protrusions 52, 52, and then expands the one of the locker protrusions 52, 52 outward diametrically. When the one of the locker protrusions 52, 52 is expanded outward diametrically, at least one of the letter "C"-shaped portion 51's fitting protrusions 55, 55 keeps being fitted into the housing 31's corresponding fitting dent 33, and the other one of the fitting protrusions 55, 55 turns into being locked to the other corresponding fitting dent 33 slightly, as illustrated in FIG. 13.

At this moment, the male member 1's insertion end 1c exerts diametrically expanding force on the checking member 5's letter "C"-shaped portion 51, thereby producing force that shifts or displaces the letter "C"-shaped portion 51 in the circumferential direction in the letter "C"-shaped portion 51. However, the fitting between the one of the fitting protrusions 52, 52 and the counterpart fitting dent 33, or the slight locking between the other one of the fitting protrusions 52, 52 and the counterpart fitting dent 33, inhibits the letter "C"-shaped portion 51 from displacing circumferentially.

That is, elastic restoring force, which makes one of the locker protrusions 52, 52 of the checking member 5's letter "C"-shaped portion 51 return inward in the diametric direction, acts on the one of the locker protrusions 52, 52 sufficiently. Accordingly, when the male member 1's insertion end 1c is released from the contact with the one of the locker protrusions 52, 52, the elastic restoring force puts the one of the locker protrusions 52, 52 back to the original position. Consequently, even when an assembly-line worker or robot pull the checking member 5 strongly in the axially perpendicular direction, the checking member 5 is hardly removed readily from the housing 31 of the female member 10's female-member body 3. Therefore, it is possible to keep the checking member 5 from being detached from the housing 31, even though the coupling between the male member 1 and the female member 10 is incomplete (or improper). All in all, the checking member 5 can perform its own function more reliably.

In particular, the present connector according to Example No. 1 comprises the two fitting protrusions 55, 55, with which the checking member 5's letter "C"-shaped portion 51 is provided, and the two fitting dents 33, 33, which are formed in the outer peripheral of the female-member body 3's housing 31 so as to separate from each other circumferentially in a well balanced manner. Therefore, it is possible to inhibit the checking member 5 and the housing 31 securely from shifting or displacing relatively to each other in the circumferential direction.

In the present connector according to Example No. 1, since the fitting dents 33, 33 . . . , with which the female-member body 3's housing 31 is provided, do not protrude outward from the outer peripheral surface of the housing 31, it is not needed to change the outside-diameter dimension of the housing 31. Therefore, when a cover is attached onto the outer periphery of the housing 31, or even when the size of the housing 31 cannot be changed in view of piping layout, it is possible to provide the housing 31 with desirable fitting dents 33, 33 . . . .

As described above, the present connector according to Example No. 1 enables the checking member 5 to fulfill the function of checking member per se more reliably, without ever changing the outside-diameter dimension of the female-member body 3's housing 31.

Moreover, the present connector according to Example No. 1 comprises the fitting dents 33, 33 with a triangular cross section whose size coincides with that of the fitting protrusions 55, 55. Accordingly, the fitting dents 33, 33 . . . , and the fitting protrusions 55, 55 contact with each other at their circumferentially opposite surfaces mutually. Consequently, the fitting protrusions 55, 55, and the fitting dents 33, 33 . . . can be inhibited securely from shifting or displacing relatively to each other circumferentially. Therefore, it is feasible to keep the checking member 5 from coming off from the housing 31 of the female member 10's female-member body 3, even though the male member 1 is coupled to the female member 10 incompletely (or improperly). Thus, the fitting dents 33, 33 . . . , and the fitting protrusions 55, 55 enable the checking member 5 to perform its own function more reliably.

In addition, not only the fitting dents 33, 33 . . . and the fitting protrusions 55, 55 are formed as described above, but also they are formed so as to contact with each other at the axially opposite side surfaces. Accordingly, it is possible to inhibit the fitting protrusions 55, 55, and the fitting dents 33, 33 . . . securely from shifting or displacing relatively to each other in the axial direction. Moreover, when an assembly-line worker or robot pulls out the checking member 5 in such an oblique direction that it is inclined toward one of the axially opposite ends, or toward the other one of them, with respect to the axially perpendicular direction, the fitting dents 33, 33 . . . , and the fitting protrusions 55, 55 can prevent the checking member 5 from inclining in the pull-out direction. Consequently, the checking member 5 hardly inclines in the pull-out direction, and thereby it is less likely to disengage the locking between the first lockers 52a, 52a of the checking member 5 and the circumferentially opposite ends 35a, 35a of the windows 35, 35. Thus, the fitting dents 33, 33 . . . , and the fitting protrusions 55, 55 make it possible for the checking member 5 to fulfill the function of the checking member per se appropriately.

Moreover, the two fitting protrusions 55, 55 are disposed respectively on the opposite sides of the checking member 5's letter "C"-shaped portion 51, opposite sides which hold the circumferentially central section of the letter "C"-shaped portion 51 between them. Thus, the separation distance between the two fitting protrusions 55, 55 expands because the letter "C"-shaped portion 51 expands diametrically when an assembly-line worker or robot attaches the checking member 5 onto the female member 10. When the checking member 5 is attached to the female member 10, the checking member 5 can engage with the female member 10 firmly at the inner side between the two fitting protrusions 55, 55 (or the section adjacent to the circumferentially central section). That is, the two fitting protrusions 55, 55 exhibit heightened engaging force onto the fitting dents 33, 33. Thus, the two fitting protrusions 55, 55 can inhibit the letter "C"-shaped portion 51 more effectively from shifting or displacing in the circumferential direction.

In addition, the fitting dents 33, 33 . . . open in the outer peripheral surface of the female-member body 30's housing 31 alone, and are formed in a non-penetrating manner to the inner peripheral surface of the housing 31. Thus, the fitting dents 33, 33 can heighten the rigidity or strength of the housing 31.

Note that, although it has been described so far how the present connector according to Example No. 1 operates to produce the advantages when an assembly-line worker or robot pulls the checking member 5 from out of the female-member 30's housing 31 in the axially perpendicular direction, the present connector according to Example No. 1 produces the same advantages even when an assembly-line worker or robot pulls the checking member 5 in directions that are inclined slightly from the aforementioned axially perpendicular direction.

Example No. 2

A connector according to Example No. 2 of the present invention will be described with reference to FIGS. 14 through 18. The present connector according to Example No. 2 comprises the same constituent elements as those of the present connector according to Example No. 1 basically. However, the present connector according to Example No. 2 is distinct from the present connector according to Example No. 1 in the parts at which the female-member body 30's housing 31 is provided with the fitting dents 33, 33 . . . , and in the parts at which the checking member 5 is provided with the fitting protrusions 55, 55. Note hereinafter that, in describing the present connector according to Example No. 2, the female-member body is labeled "103," and the checking member is labeled "105"; and moreover the fitting dents are labeled "133," respectively, and the fitting protrusions are labeled "155," respectively. The other constituent elements that are identical to those of the present connector according to Example No. 1 are designated with the same reference numerals in FIGS. 14 through 18, and their detailed descriptions will be omitted herein. Hence, the present connector according to Example No. 2 will be detailed hereinafter while focusing on the distinct constituent elements.

Figure 16:
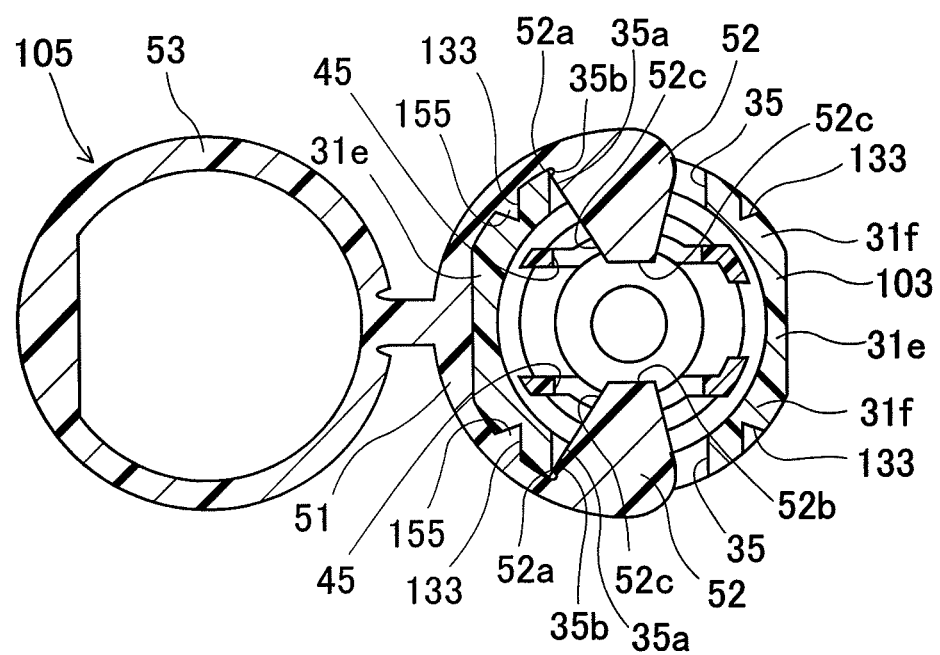
FIG. 16 is an axial cross-sectional view for illustrating the present connector that is directed to Example No. 2, axial cross-sectional view which is taken in the directions of arrows "16"-"16" designated in FIG. 15.
Figure 17:
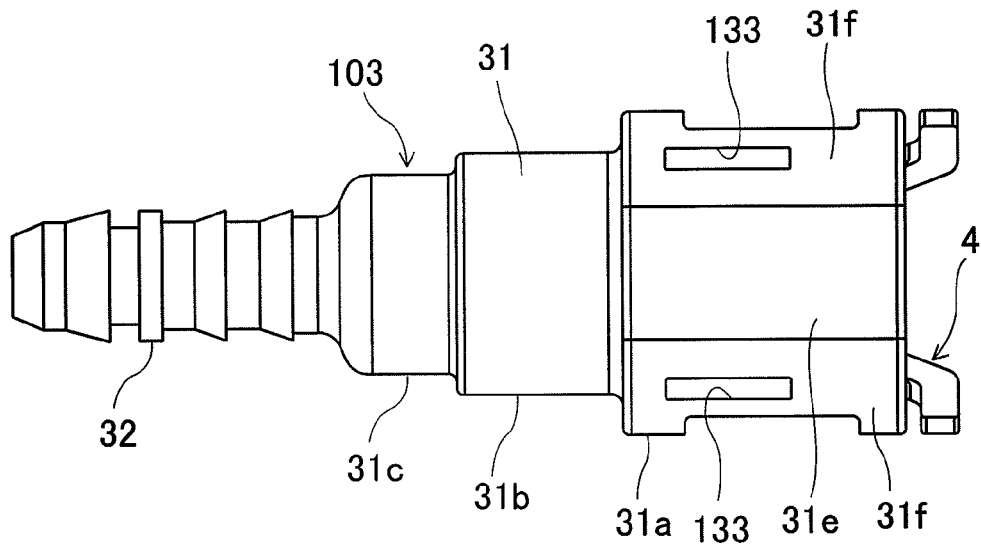
FIG. 17 is a plan view for illustrating a female member that is directed to the present connector according to Example No. 2.
Figure 18:
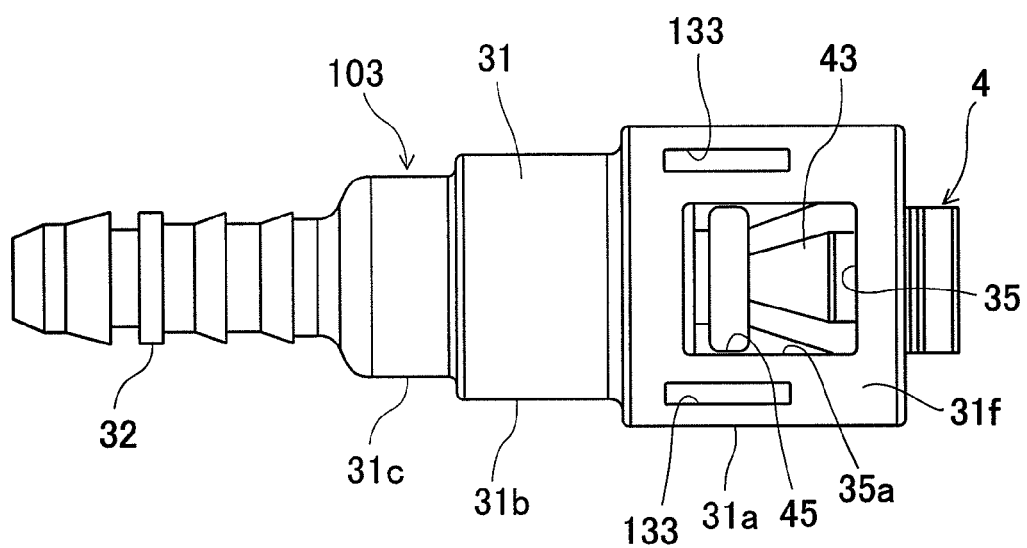
FIG. 18 is a front view for illustrating the female member that is directed to the present connector according to Example No. 2.
Figure 19:
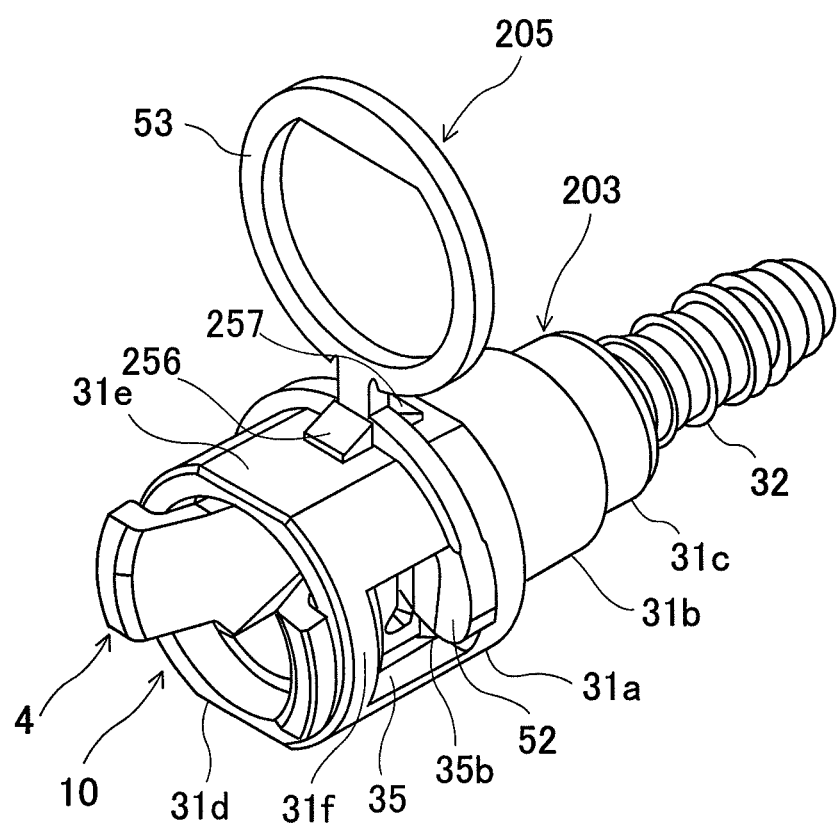
FIG. 19 is a perspective view for illustrating a connector that is directed to Example No. 3 according to the present invention.
Figure 20:
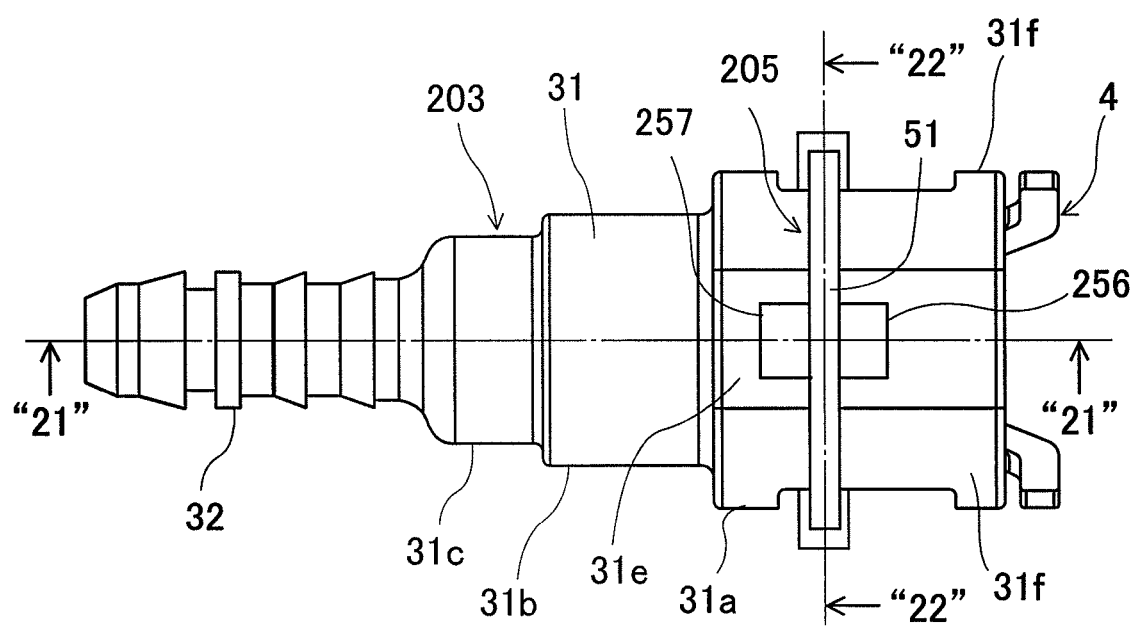
FIG. 20 is a plan view for illustrating the present connector that is directed to Example No. 3.

As best shown in FIG. 16, the paired arc walls 31$f$, 31$f$ of the female-member body 103's housing 31 are provided with the fitting dents 133, 133 in a quantity of two for each of the arc walls 31$f$, 31$f$, namely, in a quantity of four in total for the paired arc walls 31$f$, 31$f$ as a whole. The fitting dents 133, 133 . . . are disposed so that they held the windows 35, 35 between them on the opposite sides in the circumferential direction. The fitting dents 133, 133 . . . are made of a dented groove, respectively, whose cross section has a letter "V" shape and which extends in the axial direction. Moreover, the fitting dents 133, 133 . . . is extended axially in a range of from the substantially axially-central section of the arc walls 31$f$, 31$f$ to and around the other one of the axially opposite ends. Note that the fitting dents 133, 133 . . . are disposed in a quantity of two for each of the arc walls 31$f$, 31$f$ because this setting makes it possible to cope with the situations where the checking member 5 is attached onto the housing 31 from any sides with respect to the housing 31 in the same manner as the present connector according to Example No. 1.

On the other hand, the fitting protrusions 155, 155, which are fitted into the two fitting dents 133, 133 of the four, are disposed at two locations, namely, at an intermediate position between the circumferentially central section of the checking member 5's letter "C"-shaped portion 51 and one of the opposite ends, and at another intermediate position between the circumferentially central section and the other one of the opposite ends. Moreover, the fitting protrusions 155, 155 are put in place one by one at the intermediate positions so as to protrude inward from the inner peripheral surface of the letter "C"-shaped portion 51 and then protrude toward the axially opposite ends of the letter "C"-shaped portion 51. The fitting protrusions 155, 155 are formed to have a shape and size that coincide with those of the fitting dents 133, 133 . . . . Specifically, the fitting protrusions 155, 155 have a triangular Cross section that coincides with the letter "V"-shaped cross-sectional shape of the fitting dents 133, 133 . . . . In addition, the fitting protrusions 155, 155 have an axial length that is substantially the same as the axial length of the fitting dents 133, 133 . . . . Thus, the fitting protrusions 155, 155 are made so that they contact with the letter "V"-shaped opposite side surfaces of the fitting dents 133, 133 that are present on their axially opposite sides.

Since the present connector according to Example No. 2 comprises the fitting protrusions 155, 155 and fitting dents 133, 133 . . . that are formed so as to extend long in the axial direction, an assembly-worker or robot can assemble the checking member 5 outward with and then retain it onto the female-member body 103's housing 31 in a more stable state. To be concrete, the circumferentially-contacting area between the fitting protrusions 155, 155 and the fitting dents 133, 133 . . . is greater than that between the fitting protrusions 55, 55 and the fitting dents 33, 33 . . . in Example No. 1. Thus, even if the insertion end 1$c$ of the male member is inserted into the housing 31 of the female member 10's female-member body 103 in such a manner that the insertion end 1$c$ is inclined toward one of the locker protrusions 52, 52 of the checking member 105's letter "C"-shaped portion 51 and then the insertion end 1$c$ expands the one of the locker protrusions 52, 52 outward diametrically when an assembly-line worker or robot inserts the male member 1 into the housing 31 of the female member 10, the fitting protrusions 155, 155 and fitting dents 133, 133 . . . make it possible to inhibit the letter "C"-shaped portion 51 more reliably from shifting or displacing in the circumferential direction. Note that the checking member 105 that is directed to the present connector according to Example No. 2 comes to have a comparatively large size axially by setting the axial length of the fitting protrusions 155, 155 longer than the axial length of the fitting protrusions 55, 55 that are directed to the present connector according to Example No. 1. To put it differently, it is possible to diametrically downsize the checking member 5 that is directed to the present connector according to Example No. 1.

Example No. 3

A connector according to Example No. 3 of the present invention will be described with reference to FIGS. 19 through 27. The present connector according to Example No. 3 comprises the same constituent elements as those of the present connector according to Example No. 1 basically. However, the present connector according to Example No. 3 is distinct from the present connector according to Example No. 1 in the parts at which the female-member body 30's housing 31 is provided with the fitting dents 33, 33 . . . , and in the parts at which the checking member 5 is provided with the fitting protrusions 55, 55. Moreover, the present connector according to Example No. 3 is distinct from the present connector according to Example No. 1 in that its checking member 205 further comprises a first inclination inhibitor 256, and a second inclination inhibitor 257. Note hereinafter that, in describing the present connector according to Example No. 3, the female-member body is labeled "203," and the checking member is labeled "205"; and moreover the fitting dents are labeled "233," respectively, and the fitting protrusion is labeled "255." The other constituent elements that are identical to those of the present connector according to Example No. 1 are designated with the same reference numerals in FIGS. 19 through 27, and their detailed descriptions will be omitted herein. Hence, the present connector according to Example No. 3 will be detailed hereinafter while focusing on the distinct constituent elements.

Figure 21:
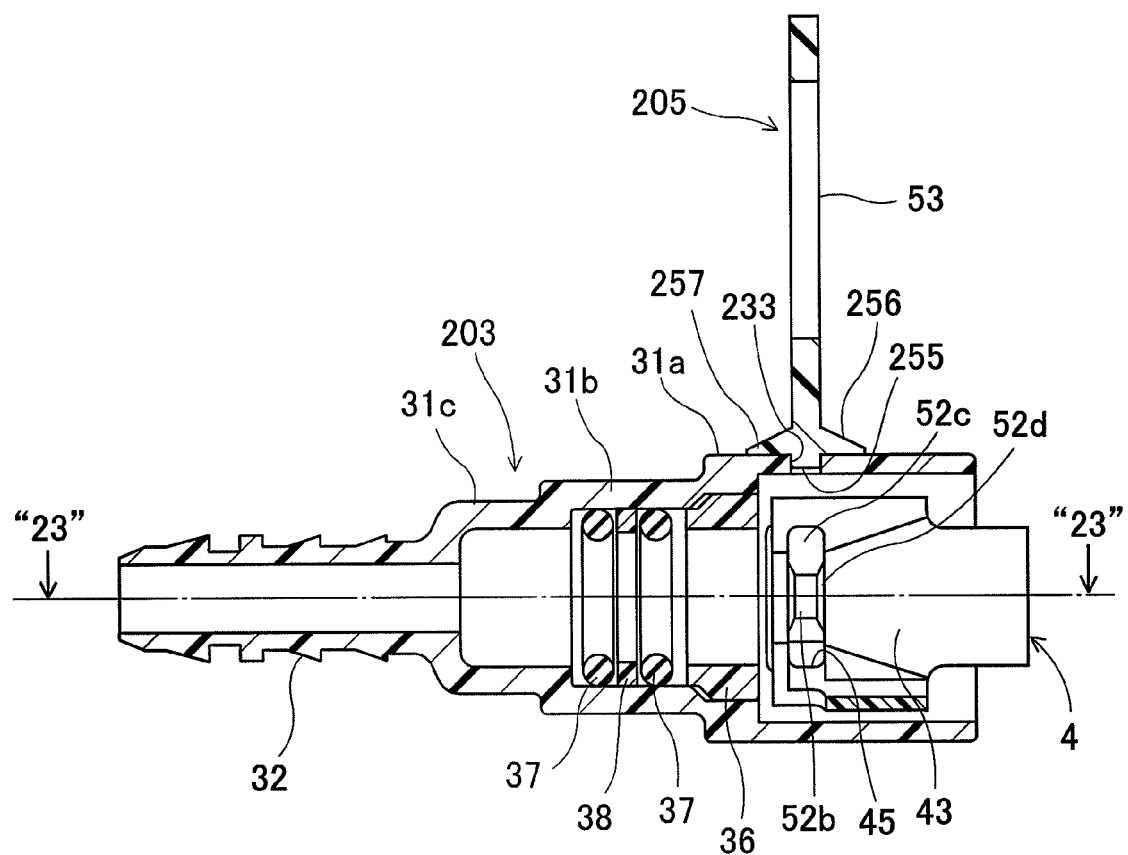
FIG. 21 is an axial cross-sectional view for illustrating the present connector that is directed to Example No. 3, axial cross-sectional view which is taken in the directions of arrows "21"-"21" designated in FIG. 20.
Figure 22:
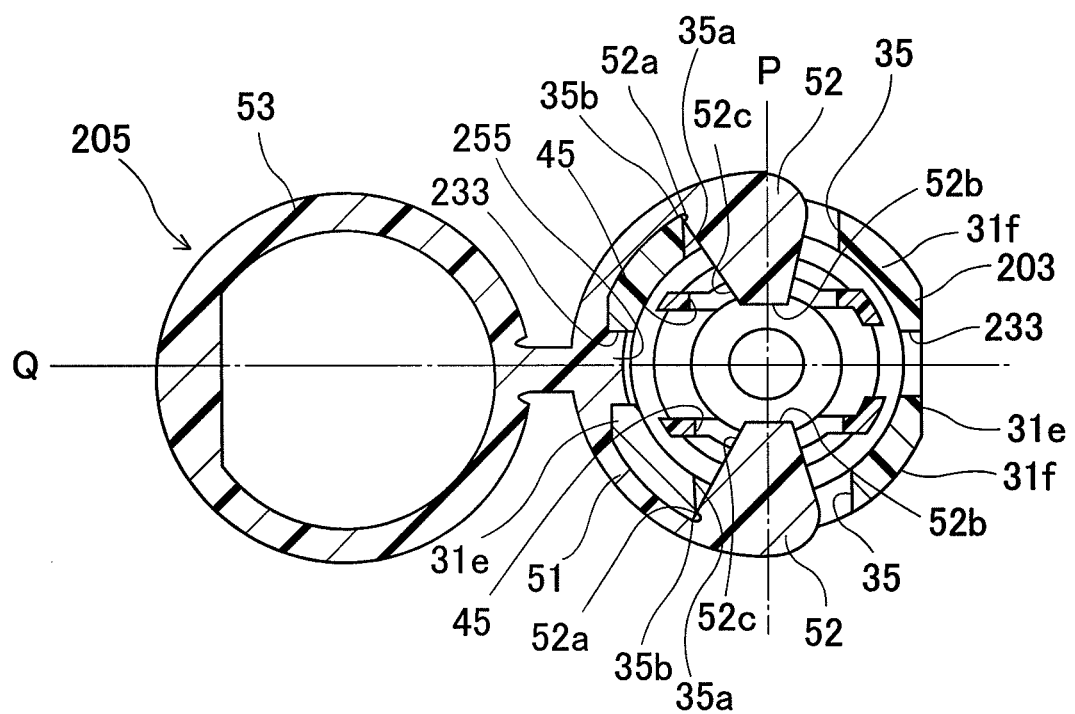
FIG. 22 is an axially-perpendicular cross-sectional view for illustrating the present connector that is directed to Example No. 3, axially-perpendicular cross-sectional view which is taken in the directions of arrows "22"-"22" designated in FIG. 20.
Figure 23:
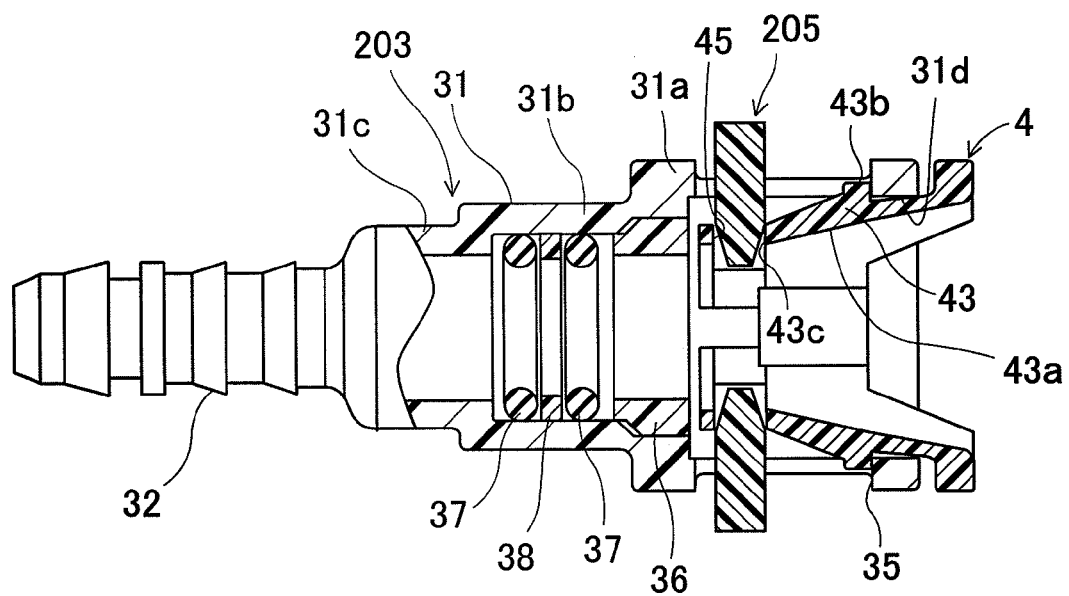
FIG. 23 is another axial cross-sectional view for illustrating the present connector that is directed to Example No. 3, another axial cross-sectional view which is taken in the directions of arrows "23"-"23" designated in FIG. 21.
Figure 24:
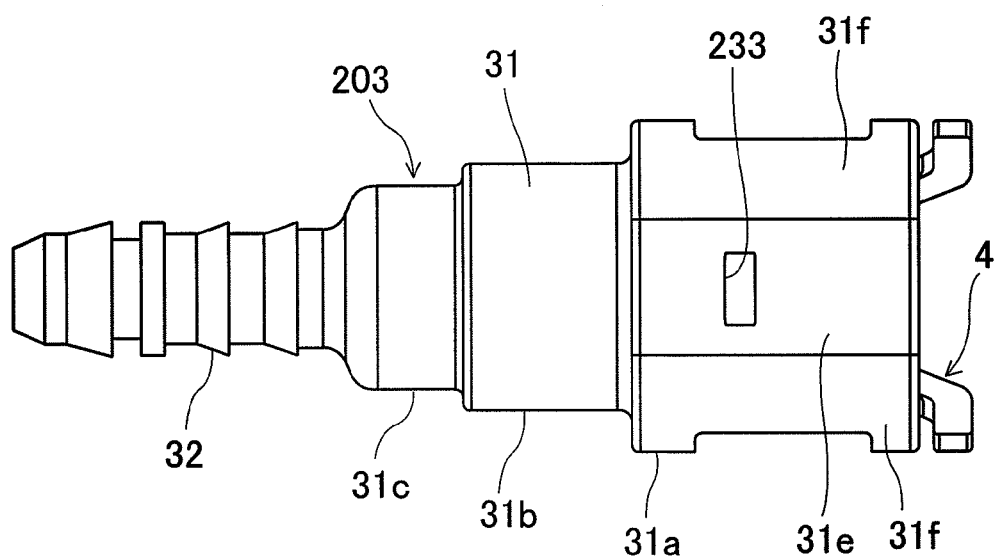
FIG. 24 is a plan view for illustrating a female member that is directed to the present connector according to Example No. 3.

As illustrated in FIGS. 21 and 22, the flat walls 31$e$, 31$e$ of the female-member body 203's housing 31 are provided with the fitting dents 233, 233 at locations that are away from the axial center of the major-diameter portion 31$a$ and adjacent to the other opposite end. Moreover, as shown in the drawings, the fitting dents 233, 233 are formed as a rectangular shape with a size whose circumferential length is about twice as large as the axial length. In addition, a through hole, which penetrates the flat walls 31$e$, 31$e$ to open in the both surfaces, namely, not only in the outer peripheral surface but also in the inner peripheral surface, makes the fitting dents 233, 233, respectively, as best shown in FIG. 22. Thus, the fitting dents 233, 233 have the greatest depth maximally in the thickness-wise direction of the housing 31, thereby exhibiting a greater hooking magnitude to the one and only fitting protrusion 255 that is to be fitted into them, respectively. Note that the fitting dents 233, 233 are disposed in a quantity of two for each of the flat walls 31$e$, 31$e$ because this setting makes it possible to cope with the situations where the checking member 205 is attached onto the housing 31 from any sides with respect to the housing 31 in the same manner as the present connector according to Example No. 1.

Figure 25A:
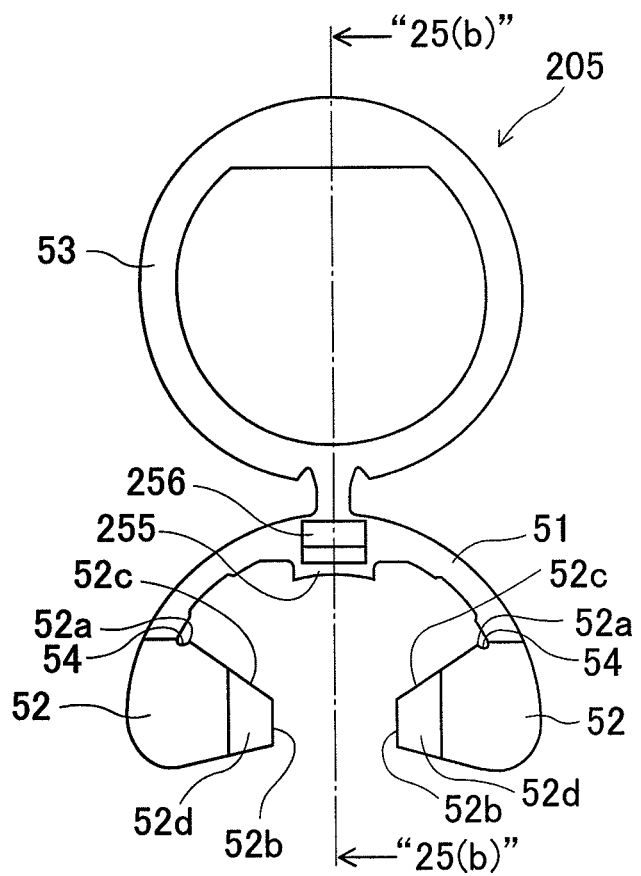
FIG. 25(a) is the front view and FIG. 25(b) is the cross-sectional view that is taken in the directions of arrows "25(b)"-"25(b)" designated in FIG. 25(a).

As illustrated in FIG. 25, the checking member 205 comprises the letter "C"-shaped portion 51, the paired locker protrusions 52, 52, the knob 53, the protrusion 255, a first inclination inhibitor 256, and a second inclination inhibitor 257.

The fitting protrusion 255 is disposed so as to protrude inward from the inner peripheral surface of the checking member 205's letter "C"-shaped portion 51. Moreover, the fitting protrusion 255 is formed as a rectangular shape with a size that coincides with that of the fitting dents 233, 233. In addition, the fitting protrusion 255 is fitted into either one of the paired fitting dents 133, 133 which are formed respectively in one of the housing 31's flat walls 31e, 31e. Thus, when an assembly-line worker or robot assembles the checking member 205 outward with and then retains it onto the housing 31 of the female-member body 203, the checking member 205 and housing 31 are put in such a state that the circumferentially opposite side surfaces of the fitting protrusion 255 contact with the circumferentially opposite side surfaces of the one of the fitting dents 133, 133; and the axially opposite side surfaces of the fitting protrusion 255 contact with the axially opposite side surfaces of the one of the fitting dents 133, 133.

Figure 25B:
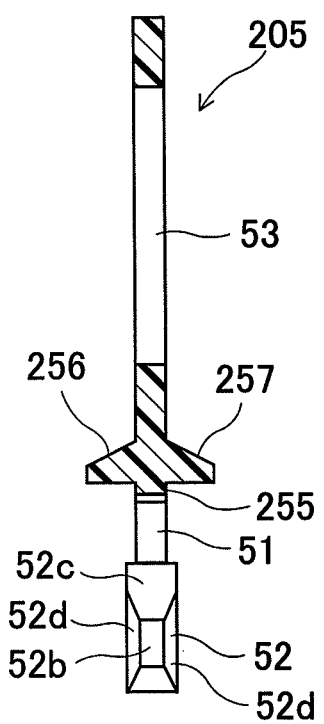

As illustrated in FIG. 25(b), the first inclination inhibitor 256 is disposed so as to extend from the circumferentially central section of the letter "C"-shaped portion 51 toward one of the axially opposite ends of the female-member body 203's housing 31. When the checking member 205 is assembled outward with and then retained onto the housing 31, the first inclination inhibitor 256 extends up to the substantially middle of the housing 31's major-diameter cylindrical portion 31a, as best shown in FIG. 21. On the other hand, the second inclination inhibitor 257 is disposed so as to extend from the circumferentially central section of the letter "C"-shaped portion 51 toward the other one of the axially opposite ends of the female-member body 203's housing 31. When the checking member 205 is assembled outward with and then retained onto the housing 31, the second inclination inhibitor 257 extends up to and around the other one of the axially opposite ends of the housing 31's major-diameter cylindrical portion 31a. Moreover, the first inclination inhibitor 256, and second inclination inhibitors 257 have an inner peripheral surface, which comes in contact with the outer peripheral surface of the major-diameter portion 31a when the checking member 205 is assembled outward with and then retained onto the housing 31, respectively.

Thus, the first inclination inhibitor 256, and the second inclination inhibitor 257, which come in contact with the outer peripheral surface of the housing 31's outer peripheral surface, inhibit the checking member 205' letter "C"-shaped portion 51, which is retained to the housing 31 so as to rise therefrom in the axially perpendicular direction, from inclining toward one of the axially opposite ends of the housing 31's major-diameter portion 31a, or toward the other one of the axially opposite ends. To be concrete, the inner peripheral surface of the first inclination inhibitor 256, which extends toward one of the axially opposite ends of the major-diameter portion 31, comes in contact with the outer peripheral surface of the major-diameter portion 31, and thereby inhibits the letter "C"-shaped portion 51 from inclining toward the one of the axially opposite ends. On the other hand, the inner peripheral surface of the second inclination inhibitor 257, which extends toward the other one of the axially opposite ends of the major-diameter portion 31, comes in contact with the outer peripheral surface of the major-diameter portion 31, and thereby inhibits the letter "C"-shaped portion 51 from inclining toward the other one of the axially opposite ends.

Figure 26:
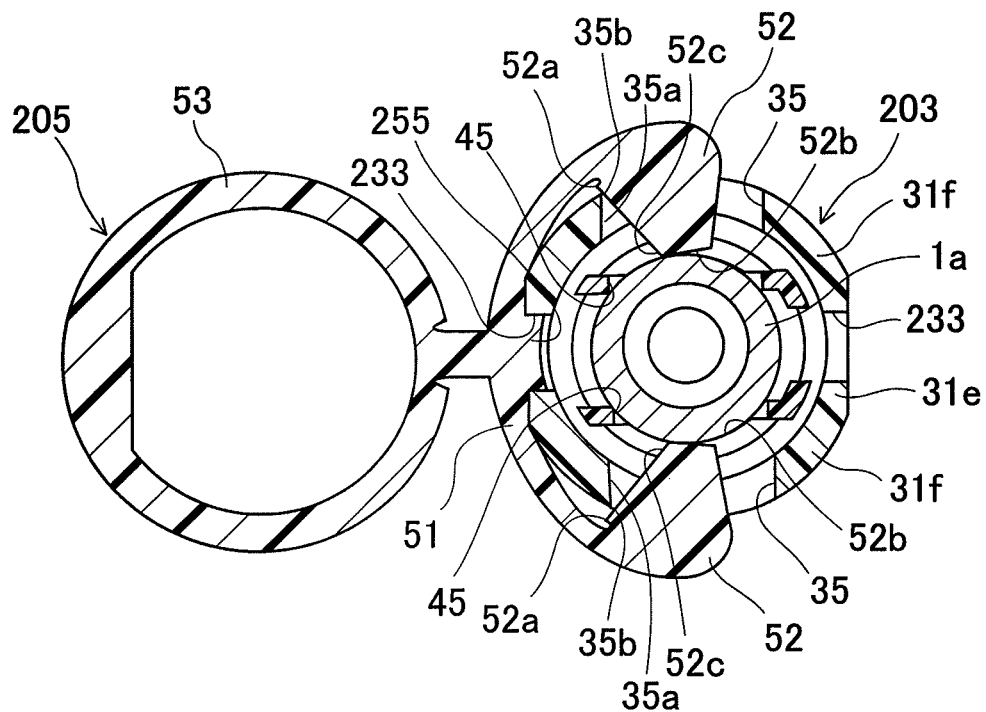
FIG. 26 is a cross-sectional view for illustrating the present connector according to Example No. 3 when the male member is inserted into the female member completely, cross-sectional view which is taken in the directions of arrows "26"-"26" designated in FIG. 11.

When an assembly-line worker or robot inserts the male member 1 into the present connector according to Example No. 1 completely, the male member 1's insertion end 1a presses the leading-end contacts 52b, 52b of the locker protrusions 52, 52 of the checking member 205's letter "C"-shaped portion 51, leading-end contacts 52b, 52b which have been located within the locus of the ring-shaped protrusion 1a, outward radially, respectively, as illustrated in FIG. 26. Accordingly, the letter "C"-shaped portion 51 expands diametrically. When the checking member 205's letter "C"-shaped portion 51 thus expands diametrically, the inclined second lockers 52c, 52c of the locker protrusions 52, 52 make contact with and then lock to the circumferentially opposite rims 35b, 35b of the windows 35, 35 in the housing 31, as shown in FIG. 26. Consequently, the inclined second lockers 52c, 52c of the locker protrusions 52, 52, which thus lock to the circumferentially opposite rims 35b, 35b of the windows 35, 35, inhibit elastic restoring force that arises in the letter "C"-shaped portion from removing the checking member 205 from the housing 31 in the axially perpendicular direction.

Under the circumstances, when an assembly-line worker or robot tries to pull the checking member 205 out of the housing 31 of the female member 10's female-member body 203, the inclined second lockers 52c, 52c of the locker protrusions 52, 52 come in sliding contact with the circumferentially opposite rims 35b, 35b of the windows 35, 35 to expand the checking member 205's letter "C"-shaped portion 51 furthermore. Accordingly, the assembly-line worker or robot can readily pull the checking member 205 out of the housing 31 in the axially perpendicular direction. Consequently, the assembly-line worker or robot can confirm that the male member 1 has been coupled to the female member 10 completely.

Figure 27:
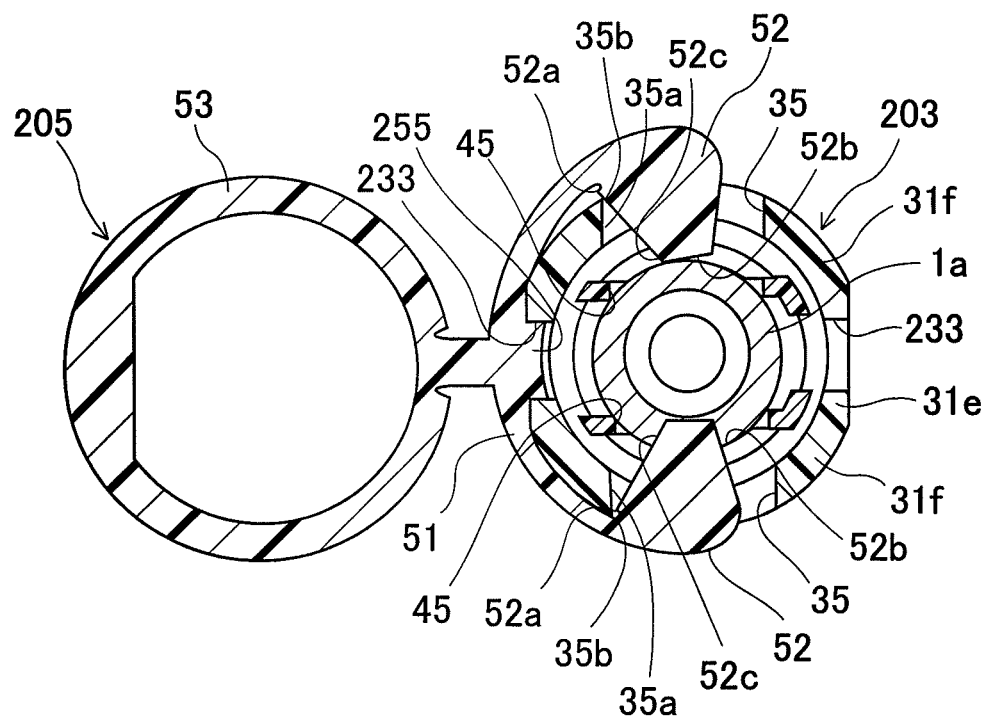
FIG. 27 is another cross-sectional view for illustrating the present connector according to Example No. 3 when the male member is inserted into the female member obliquely, another cross-sectional view which is taken in the directions of arrows "27"-"27" designated in FIG. 11.

Then, the following case will be described hereinafter with reference to FIG. 27, namely, a case where an assembly-line worker or robot inserts the male member 1's insertion end 1c in such a manner that the insertion end 1c is inclined toward one of the locker protrusions 52, 52 of the checking member 205's letter "C"-shaped portion 51 upon inserting the male member 1's insertion end 1c into the housing 31 of the female member 10's female-member body 203. If such is the case, the male member 1's insertion end 1c comes in contact with one of the locker protrusions 52, 52 of the letter "C"-shaped portion 51 to press and then expand the one of the locker protrusions 52, 52 outward diametrically. When the one of the locker protrusions 52, 52 is thus expanded outward diametrically, the housing 31's one of the fitting dents 233, 233 and the checking member 205's fitting protrusion 255 that are fitted each other as illustrated in FIG. 27 inhibit the letter "C"-shaped portion 51 from shifting or displacing circumferentially.

That is, elastic restoring force, which causes one of the locker protrusions 52, 52 of the checking member 205's letter "C"-shaped portion 51 to return inward diametrically, acts on the one of the locker protrusions 52, 52 sufficiently. Accordingly, the elastic restoring force returns the one of the locker protrusions 52, 52 back to the original position when an assembly-line worker or robot releases the male member 1's insertion end 1c from the contact with the one of the locker protrusions 52, 52. Consequently, the checking member 205 is hardly removed readily from the housing 31 of the female member 10's female-member body 203 even when the assembly-line worker or robot pulls the checking member 205 strongly in the axially perpendicular direction. Therefore, it is possible to keep the checking member 205 from being removed from the housing 31 even though the male member 1 is coupled to the female member incompletely (or improperly). All in all, the checking member 205 can fulfill the function of checking member per se more reliably.

Moreover, in the present connector according to Example No. 3, the housing 31 of the female member 10's female-member body 203 is provided with the fitting dents 233, 233 that do not at all protrude outward from the outer peripheral surface of the housing 31. Accordingly, it is unnecessary to change the outside-diameter dimension of the housing 31. Consequently, it is possible to provide the housing 31 with desired fitting dents 233, 233 when a cover is attached onto the housing 31, or even when the size of the housing 31 cannot be changed in connection with piping layout. Therefore, the present connector according to Example No. 3 enables the checking member 205 to perform its own function more reliably without ever changing the outside-diameter dimension of the housing 31.

In addition, in the present connector according to Example No. 3, the checking member 205 comprises the fitting dents 233, 233 and fitting protrusion 255 that are not only formed as a coinciding rectangular shape but also whose circumferentially opposite side surfaces contact with each other. Accordingly, it is possible to inhibit the fitting dents 233, 233 and fitting protrusion 255 from shifting or displacing relatively in the circumferential direction. Consequently, it is feasible to keep the checking member 205 from coming off from the housing 31 of the female member 10's female-member body 203 more effectively even though the coupling between the male member 1 and the female member 10 is incomplete (or improper). Therefore, the fitting dents 233, 233 and fitting protrusion 255 make it possible for the checking member 205 to fulfill the function of checking member per se more reliably.

Moreover, the fitting dents 233, 233 and fitting protrusion 255 are made so that their axially opposite side surfaces contact with each other at the same time. Accordingly, it is possible to inhibit the fitting dents 233, 233 and fitting protrusion 255 from shifting or displacing relatively in the axial direction. In addition, when an assembly-line worker or robot tries to pull out the checking member 205 obliquely with respect to the axially perpendicular direction so that the checking member 205 is inclined toward one of the axially opposite ends of the housing 31 of the female member 10's female-member body 203, or toward the other one of the axially opposite ends, the fitting dents 233, 233 and fitting protrusion 255 prevent the checking member 205 from inclining in the pull-out direction. Consequently, the checking member 205's letter "C"-shaped portion 51 hardly inclines in the pull-out direction. As a result, it hardly becomes likely to unlock the locking between the checking member 205's first lockers 52a, 52a and the circumferentially opposite ends 35a, 35a of the windows 35, 35 in the housing 31. Therefore, the fitting dents 233, 233 and fitting protrusion 255 enable the checking member 205 to perform its own function adequately.

In addition, the present connector according to Example No. 3 comprises the checking member 205 that has the first and second inclination inhibitors 256 and 257. Accordingly, even if an assembly-worker or robot tries to pull out the checking member 205 obliquely with respect to the axially perpendicular direction so that the checking member 205 is inclined toward one of the axially opposite ends of the housing 31 of the female member 10's female-member body 203, or toward the other one of the axially opposite ends, before the assembly-line worker or robot inserts the male member 1 into the female member 10 completely; namely, when the coupling between the male member 1 and the female member 10 is not finished completely (or properly) and when the checking member 205's first lockers 52a, 52a and the circumferentially opposite ends 35a, 35a of the windows 35, 35 in the housing 31 are still locked to each other; the first and second inclination inhibitors 256 and 257 inhibit the checking member 205 from inclining in the pull-out direction. Consequently, it becomes less likely to unlock the coupling between the checking member 205's first lockers 52a, 52a and the windows 35, 35's circumferentially opposite ends 35a, 35a. Therefore, even though the male member 1 and the female member 10 have not been coupled to each other completely, the checking member 205 hardly comes off from the housing 31 even if an assembly-line worker or robot should pull out the checking member 205 strongly in the oblique direction. All in all, the first and second inclination inhibitor 256 and 257 allow the checking member 205 to fulfill the function of checking member per se adequately.

In particular, in the present connector according to Example No. 3, the checking member 205's fitting protrusions 255 is fitted into the housing 31's one of the fitting dents 233, 233 so that the fitting protrusion 255's axially opposite side surfaces contact with the one of the fitting dents 233, 233's axially opposite side surfaces. Accordingly, the fitting protrusion 255 and fitting dents 233, 233 are inhibited from shifting or displacing relatively to each other in the axial direction. Consequently, it is possible to expect that the fitting protrusion 255 and fitting dents 233, 233 produce a synergic effect with the first and second inclinator inhibitors 256 and 257. Moreover, the possible synergic effect also makes it feasible to downsize the first and second inclination inhibitors 256 and 257 by shortening their axial lengths.

Modified Version of Example No. 3

Figure 28:
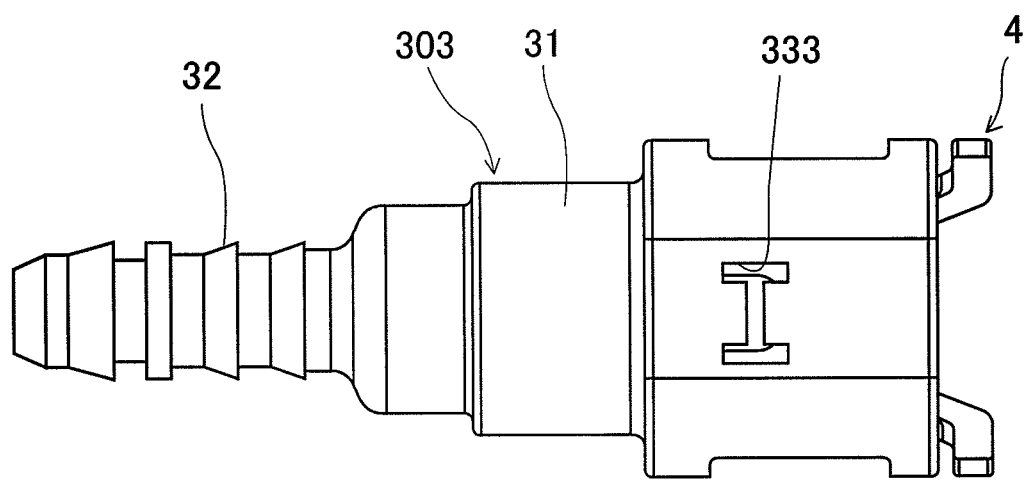
FIG. 28 is a plan view for illustrating a female member that is directed to a modified version of the present connector according to Example No. 3.
Figure 29:
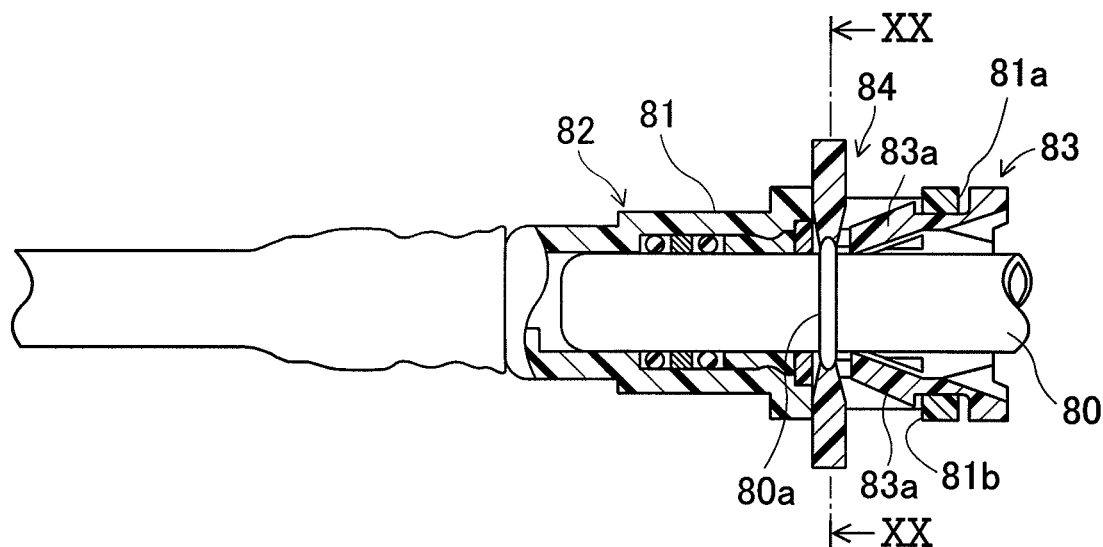
FIG. 29 is a cross-sectional view for illustrating the conventional connector after the male member is inserted into the female member.
Figure 30:
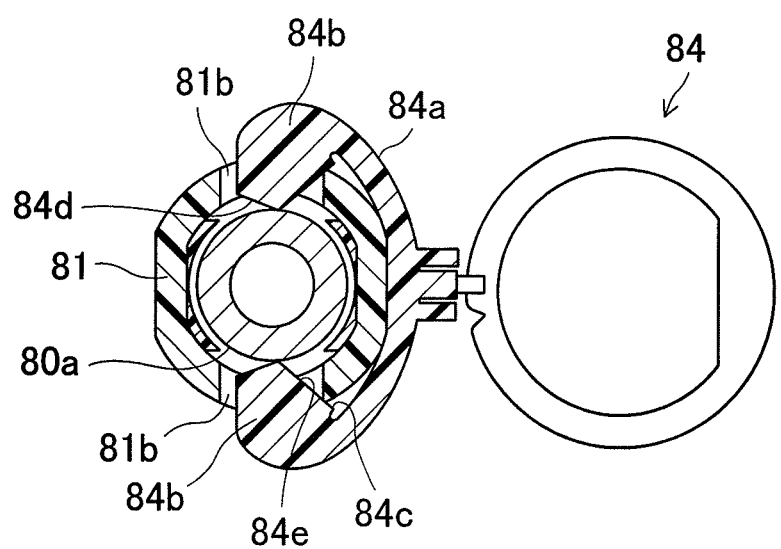
FIG. 30 is another cross-sectional view for illustrating the conventional connector after the male member is inserted into the female member.

In the present connector according to Example No. 3, the checking member 205's fitting protrusion 255, and the housing 31's fitting dents 233, 233 are formed as a rectangular shape with such a size that coincides with each other. However, the shape of the fitting protrusion 255 and fitting dents 233, 233 can be changed to any shapes variously. For example, as illustrated in FIG. 28, it is possible to form the fitting dents 233, 233 as a letter "H" shape. If such is the case, the checking member 205 can be provided with a fitting protrusion (not shown) that is formed as a letter "H" shape coinciding with that of the fitting dents 333, 333. When the fitting dents 333, 333 and the fitting protrusion are formed as a coinciding letter "H" shape, it is possible to make the engaging area between the fitting protrusions 333, 333 and the fitting protrusion greater in the circumferential direction. Accordingly, it is possible to avoid the coming-off of the checking member 205 from the housing 31 more effectively, even though the coupling between the male member 1 and the female member 10 is incomplete (or improper). Consequently, the fitting dents 333, 333 and fitting protrusion with a coinciding letter "H" shape enable the checking member 205 to perform its own function more reliably.

Having now fully described the present invention, it will be apparent to one of ordinary skill in the art that many changes and modifications can be made thereto without departing from the spirit or scope of the present invention as set forth herein including the appended claims.

What is claimed is:

1. A connector configured to be coupled to a cylindrical male member that has an insertion end provided with a ring-shaped protrusion protruding radially from a position that is spaced from an axial leading end of the insertion end, the connector comprising:
- a female member comprising a cylindrical portion on one axial end of the connector, the cylindrical portion being provided with an insertion opening end into which the insertion end of the cylindrical male member is inserted, paired windows penetrating radially and being disposed circumferentially to face each other, and a locker end locking to the ring-shaped protrusion of the cylindrical male member, which is inserted into the female member through the insertion opening end, to prevent the cylindrical male member from disengaging; and
- a checking member extending outward from and being retained on an outer peripheral surface of the cylindrical portion of the female member, and comprising a letter "C"-shaped portion having opposite ends and being capable of expanding diametrically by elastic deformation, and a pair of locker protrusions protruding inwardly from the opposite ends of the letter "C"-shaped portion respectively and then being inserted into the cylindrical portion through the paired windows in the female member, respectively,
- the locker protrusions of the checking member locking to the windows in the female member to inhibit the checking member from disengaging from the cylindrical portion of the female member before the cylindrical male member is coupled to the female member, wherein when the locker protrusions are pressed by the ring-shaped protrusion of the cylindrical male member being inserted into the female member, the locker protrusions move radially outward to expand the letter "C"-shaped portion of the checking member diametrically, thereby enabling the checking member to disengage from the cylindrical portion of the female member,
- the cylindrical portion of the female member has a fitting dent that opens on an outer peripheral surface of the cylindrical portion of the female member, and
- the checking member further comprising a fitting protrusion protruding inwardly from an inner peripheral surface of the letter "C"-shaped portion and positioned, along the inner peripheral surface of the letter "C"-shaped portion, spaced from the locker protrusions and between the locker protrusions, and then being fitted into the fitting dent of the cylindrical portion of the female member circumferentially,
- wherein the fitting protrusion of the checking member, which is fitted into the fitting dent in the cylindrical portion of the female member circumferentially, inhibits a force that the cylindrical male member exerts on the letter "C"-shaped portion in diametric expansion, to prevent the force from shifting the letter "C"-shaped portion of the checking member circumferentially, and
- when the checking member is pulled to an axial perpendicular direction from the cylindrical portion of the female member, an elastic restoring force of the locker protrusions withstands an axial perpendicular direction force less than or equal to the elastic restoring force so as to not disconnect from the female member.

2. The connector according to claim 1, wherein one of the locker protrusions moves radially outward and the other of the locker protrusions remains locked to one of the windows when the force is received by the letter "C"-shaped portion in diametric expansion.

3. The connector according to claim 1, wherein:
the cylindrical portion of the female member is provided with the fitting dent at two locations in the outer peripheral surface, the locations being separated from each other circumferentially; and
the fitting protrusion of the checking member comprises:
- a first fitting protrusion disposed on one of the opposite ends of the letter "C"-shaped portion of the checking member away from a circumferentially central section of the letter "C"-shaped portion, and fitted into one of the fitting dents corresponding to the first fitting protrusion; and
- a second fitting protrusion disposed on another one of the opposite ends of the letter "C"-shaped portion of the checking member away from the circumferentially central section of the letter "C"-shaped portion, and fitted into another one of the fitting dents corresponding to the second fitting dent.

4. The connector according to claim 3, wherein the first fitting protrusion and the second fitting protrusion are disposed on respective opposite ends of the letter "C"-shaped portion of the checking member, the opposite ends interposing the circumferentially central section of the letter "C"-shaped portion between them.

5. The connector according to claim 3, wherein:
the first fitting protrusion contacts a first surface of one of the fitting dents, the first surface being adjacent to the another one of the opposite ends of the letter "C"-shaped portion of the checking member; and
the second fitting protrusion contacts a second surface of another one of the fitting dents, the second surface being adjacent to the one of the opposite ends of the letter "C"-shaped portion of the checking member.

6. The connector according to claim 3, wherein:
the first fitting protrusion contacts a first surface of one of the fitting dents, the first surface being adjacent to the one of the opposite ends of the letter "C"-shaped portion of the checking member; and
the second fitting protrusion contacts a second surface of another one of the fitting dents, the second surface being adjacent to the another one of the opposite ends of the letter "C"-shaped portion of the checking member.

7. The connector according to claim 1, wherein the checking member further comprises an inclination inhibitor that extends integrally from around a circumferentially central section of the letter "C"-shaped portion to at least one of axially opposite end sides of the cylindrical portion of the female member and another one of axially opposite end sides of the cylindrical portion of the female member, and that comes in contact with an outer peripheral surface of the cylindrical portion of the female member at least and thereby inhibits the letter "C"-shaped portion, which is retained to rise in an axially perpendicular direction with respect to the cylindrical portion, from inclining toward at least one of the axially opposite ends and another one of axially opposite ends of the cylindrical portion.

8. The connector according to claim 1, wherein:
the female member further comprises:
- a cylindrical housing provided with the insertion opening end and the paired windows; and
- a locking member formed independently of the housing, inserted into and retained within the housing, and having paired claws capable of deforming elastically in a radial direction and disposed at positions corresponding to the paired windows, respectively; and
- the claws located at the locker end of the female member, and having an inclined inner surface that inclines inwardly in a radial direction from the insertion opening end toward an axially inner side of the female member, and the inclined inner surface is pressed by and brought into sliding contact with the ring-shaped protrusion of the male member when the male member is being inserted into the female member.

9. The connector according to claim 8, wherein the fitting protrusion has a diametrically inner end that is disposed flush with an inner peripheral surface of the housing of the female member, or that is disposed more outward diametrically than an inner peripheral surface of the housing is.

10. The connector according to claim 1, wherein the fitting dent of the cylindrical portion of the female member is a depression that does not penetrate an inner peripheral surface of the cylindrical portion of the female member.

11. The connector according to claim 1, wherein each of the pair of locker protrusions of the checking member has:
   a first locker locking to circumferentially opposite ends of the paired windows in the cylindrical portion of the female member before the cylindrical male member is coupled to the female member, thereby inhibiting the checking member from disengaging from the cylindrical portion of the female member;
   a leading-end contact being disposed within a locus of the ring-shaped protrusion of the cylindrical male member when the cylindrical male member is inserted into the female member but before the cylindrical male member is coupled to the female member, and being pressed by the ring-shaped protrusion and then moving outward radially when the cylindrical male member is completely inserted into the female member, thereby expanding the letter "C"-shaped portion of the checking member diametrically; and
   an inclined second locker locking to the circumferentially opposite rims of the windows in the cylindrical portion of the female member when the cylindrical male member is completely inserted into the female member, thereby inhibiting the checking member from disengaging from the cylindrical portion of the female member by elastic restoring force that the letter "C"-shaped portion of the checking member exerts, and extending while inclining in a generally radial direction of the cylindrical portion of the female member to further expand the letter "C"-shaped portion diametrically by sliding into contact with the circumferentially opposite rims of the windows after the cylindrical male member is completely inserted into the female member to allow the checking member to disengage from out of the cylindrical portion of the female member.

12. The connector according to claim 1, wherein:
the cylindrical portion of the female member is provided with a plurality of fitting dents that are disposed symmetrically in a circumferential direction; and
the checking member further comprises a plurality of fitting protrusions that are fitted into at least a half of the fitting dents circumferentially.

13. The connector according to claim 1, wherein:
the cylindrical portion of the female member is provided with a plurality of fitting dents that are disposed at equal intervals in a circumferential direction; and
the checking member further comprises a plurality of fitting protrusions that are fitted into at least a half of the fitting dents circumferentially.

14. The connector of claim 1, wherein the fitting protrusion is disposed on one end of the letter "C"-shaped portion of the checking member away from a circumferentially central section of the letter "C"-shaped portion.

* * * * *